US008243637B2

(12) United States Patent
Rege et al.

(10) Patent No.: US 8,243,637 B2

(45) Date of Patent: Aug. 14, 2012

(54) METHOD AND APPARATUS FOR MOBILE BROADCAST AND MULTICAST USING RANDOMIZED TRANSMIT SIGNAL PHASES IN A SINGLE FREQUENCY NETWORK

(75) Inventors: Kiran M. Rege, Marlboro, NJ (US); Krishna Balachandran, Morganville, NJ (US); Joseph H. Kang, Belle Mead, NJ (US); Kemal M. Karakayali, Highland Park, NJ (US)

(73) Assignee: Alcatel Lucent, Paris (FR)

( * ) Notice: Subject to any disclaimer, the term of this patent is extended or adjusted under 35 U.S.C. 154(b) by 545 days.

(21) Appl. No.: 12/457,044

(22) Filed: May 29, 2009

(65) Prior Publication Data

US 2010/0302984 A1 Dec. 2, 2010

(51) Int. Cl.
*H04W 74/00* (2009.01)

(52) U.S. Cl. ......................... 370/310; 370/328; 455/446

(58) Field of Classification Search ........................ None
See application file for complete search history.

(56) References Cited

U.S. PATENT DOCUMENTS

| | | | | |
|---|---|---|---|---|
| 5,793,318 | A * | 8/1998 | Jewett | 341/118 |
| 6,807,145 | B1 * | 10/2004 | Weerackody et al. | 370/203 |
| 7,002,934 | B2 * | 2/2006 | Dolgonos et al. | 370/328 |
| 7,158,579 | B2 * | 1/2007 | Hottinen | 375/267 |
| 7,944,319 | B2 * | 5/2011 | Kerr et al. | 332/144 |
| 2009/0100316 | A1 * | 4/2009 | Lakkis | 714/783 |
| 2009/0323577 | A1 * | 12/2009 | Agrawal et al. | 370/312 |
| 2010/0103855 | A1 * | 4/2010 | Wang et al. | 370/312 |
| 2010/0142634 | A1 * | 6/2010 | Filippi et al. | 375/260 |

FOREIGN PATENT DOCUMENTS

CN 101272522 * 9/2008

OTHER PUBLICATIONS

Xu, et al, Human Assisted Machine Translation to English of CN 101272522, Sep. 24, 2008, Dialog, pp. 1-8.*

* cited by examiner

*Primary Examiner* — Robert Scheibel

(74) *Attorney, Agent, or Firm* — Harness, Dickey & Pierce, P.L.C.

(57) ABSTRACT

A base station transmitter for a broadcast/multicast single frequency network may include a base station component configured to randomize a phase of the signal for the base station transmitter to transmit, wherein the base station transmitter is configured to transmit a signal having a frequency common to a frequency of a signal sent by another base station component in the network. A method for improving performance of single frequency networks may include transmitting single frequency signals from base stations with pseudo-random phases including in the signals, data that permits a receiver compatible with the network to synchronously replicate the pseudo-random phases used in the transmission of the single frequency signals.

18 Claims, 8 Drawing Sheets

METHOD AND APPARATUS FOR MOBILE BROADCAST AND MULTICAST USING RANDOMIZED TRANSMIT SIGNAL PHASES IN A SINGLE FREQUENCY NETWORK

BACKGROUND

1. Field

Example embodiments in accordance with the present invention relate to a method and apparatus for mobile broadcast and multicast using randomized transmit signal phases in a single frequency network.

2. Description of the Related Art

Single Frequency Networks (SFN) are often used to support broadcast applications where multiple users dispersed over the coverage area of the SFN tune to the application of common interest to all. In an SFN with multiple base stations, the signals corresponding to the broadcast application are transmitted in the same frequency band by all base stations. The idea is that as mobile users move from the coverage of one base station to the next, the mobile users do not need to perform any special actions such as handoff or tuning to a different frequency band to continue to receive the signals associated with the broadcast application.

A transmission technology that appears to be well-suited to SFN-based broadcast is Orthogonal Frequency Division Multiplexing (OFDM), where the base stations participating in the SFN transmit identical signals over the set of sub-carriers allocated to the broadcast application. OFDM allows (within certain limits) signals transmitted by different base stations to be added at the receiver, provided they all use the same set of sub-carriers to transmit an identical set of signals. In a broadcast application over an SFN, this scheme is expected to help receiver devices at cell edges by allowing them to process aggregate signals originating from multiple base stations rather than having to rely on a single base station for the received signal. However, even with OFDM, destructive interaction can take place between signals originating from different base station because of the relative phase differences.

A Single Frequency Network (SFN) supporting a broadcast application is described for the purposes of example. For illustrative purposes, the SFN is assumed to use a multi-carrier transmission scheme such as Orthogonal Frequency Division Multiplexing (OFDM). In such a scheme, identical signals are transmitted by each of the participating base stations on each tone or sub-carrier being used for the broadcast application. Moreover, these signals are time-aligned within permissible limits. Now, if a receiver device listening to the broadcast application receives signals from multiple base stations, the difference between the transmission delays corresponding to different base stations would cause the signals to arrive at the receiver at somewhat different times. However, as long as the relative delays for different base stations are within a certain limit (corresponding to the cyclic prefix in an OFDM system), there is no inter-symbol interference due to this delay spread, which in many other transmission technologies can only be mitigated with sophisticated equalization techniques.

For a receiver device that receives signals from N base stations participating in an SFN using an OFDM transmission scheme, let $x^{(k)}(t)$ denote the symbol transmitted by all of these base stations using the $k^{th}$ sub-carrier during time-slot t. The corresponding received signal $r^{(k)}(t)$ is then given by:

$$r^{(k)}(t) = \sum_{i=1}^{N} h_i^{(k)}(t)x^{(k)}(t) + n^{(k)}(t), \tag{1}$$

where for i=1, 2, . . . , N, $h_i^{(k)}(t)$ denotes the channel coefficient for the signal transmitted by the $i^{th}$ base station over the $k^{th}$ sub-carrier during time-slot t, and $n^{(k)}(t)$ represents the thermal noise in the corresponding received signal. Note that as the above equation indicates, the signals being received from different base stations cannot be separated so that the entire received signal for any sub-carrier (for example, k) appears as if it is being received over an aggregate channel with channel coefficient given by:

$$h^{(k)}(t) = \sum_{i=1}^{N} h_i^{(k)}(t). \tag{2}$$

The resulting signal-to-noise ratio (SNR), denoted by $\rho^{(k)}(t)$, equals:

$$\begin{aligned}\rho^{(k)}(t) &= |h^{(k)}(t)|^2 E\left[|x^{(k)}(t)|^2\right] / \sigma^2 \\ &= \left|\sum_{i=1}^{N} h_i^{(k)}(t)\right|^2 E\left[|x^{(k)}(t)|^2\right] / \sigma^2,\end{aligned} \tag{3}$$

where $\sigma^2$ represents the variance of receiver noise.

The N channel coefficients, $h_i^{(k)}(t)$, are uncorrelated in phase because they are associated with different base stations. As a consequence, the aggregate channel coefficient, $h^{(k)}(t)$, can have a large or small amplitude depending on whether the individual channel coefficients add constructively or destructively. Typically, a broadcast application is assigned a plurality of sub-carriers (also referred to as tones) within the spectrum associated with the OFDM system. If the fading environment for a given user is sufficiently frequency selective and if the tones allocated to the broadcast application are well distributed over the spectrum associated with the OFDM system, the relative phase differences between signals being received from different base stations will vary a great deal over the tones being used by the broadcast application. As a consequence, it is unlikely that that a user will experience destructive superposition of signal components at all tones associated with the broadcast application. This is the rationale that underlies standard SFN architectures. Now, if the fading environment for some users is not sufficiently frequency selective (e.g. characterized by a very small delay spread) or if the broadcast application uses a small, contiguous set of tones, the above rationale no longer applies; as a result, such users can easily find themselves in situations where destructive superposition of signal components gives rise to poor SNR levels at all (or most of) the tones associated with the broadcast application. These users will not be able to listen to (or watch) the broadcast unless the transmit power is raised by a sufficient amount. In a broadcast application requiring a given data rate, the objective is to serve at least a certain fraction (e.g. 95%) of the potential user population in as efficient a manner as possible. Whether this coverage objective can be met at a given transmit power level is determined by the lower percentiles (e.g. $5^{th}$ percentile if at least 95% of the population is to be served) of the SNR distribution. Destructive signal addition caused by phase differences suppresses the lower percentiles of the SNR distribution, which means that a higher transmit power needs to be used in order to meet the coverage objective.

SUMMARY

In some embodiments in accordance with the invention a base station transmitter is provided is provided. The base station transmitter for a broadcast/multicast single frequency network may include a base station component configured to randomize a phase of the signal for the base station transmitter to transmit, wherein the base station transmitter is configured to transmit a signal having a frequency common to a frequency of a signal sent by another base station component in the network. Other embodiments of the invention may include a signal containing the randomized phase and/or tones described herein. In another embodiment, a first base station apparatus in a single frequency network, is capable to transmit, when operating in a single frequency network mode, a broadcast/multicast signal at a frequency in common with the frequency of a broadcast/multicast signal transmitted by a second base station apparatus in the single frequency network; and configured to randomize a phase of the signal for the base station to transmit.

In other embodiments in accordance with the invention, a method for improving performance of single frequency networks is provided. The method includes transmitting single frequency signals from base stations with pseudo-random phases; including in the signals, data that permits a receiver compatible with the network to synchronously replicate the pseudo-random phases used in the transmission of the single frequency signals.

In yet other embodiments in accordance with the invention, a method for signal transmission at each base station in a broadcast/multicast single frequency network is provided. The method includes organizing signals in groups of tones; generating a pseudo-random phase for each group of tones; and rotating all tones within a group of tones by the same pseudo-random phase as was generated by the base station for the group of tones for a particular time slot.

DETAILED DESCRIPTION OF EXAMPLE EMBODIMENTS

Figure 1:
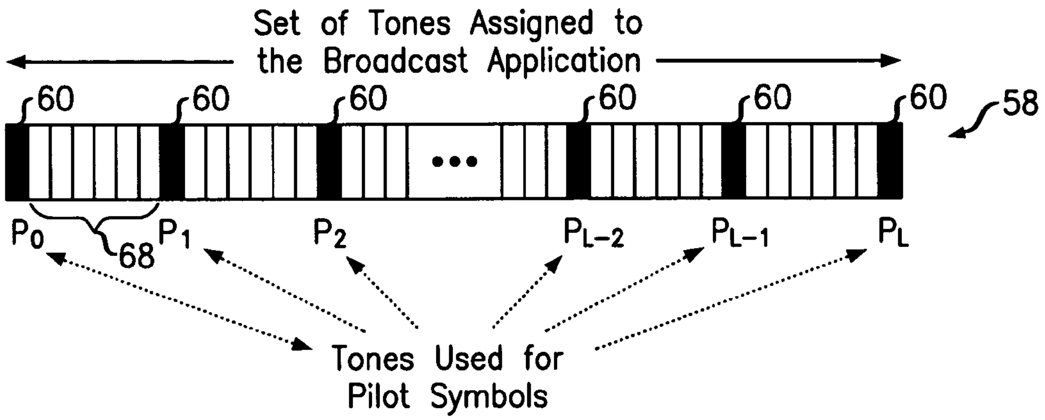
FIG. 1 is an illustration of a span of a continuous band of frequencies illustrating tones used for pilot symbols in a single frequency network.

Various example embodiments will now be described more fully with reference to the accompanying drawings in which some example embodiments are illustrated.

Before discussing example embodiments in more detail, it is noted that example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. As used herein, the term "and/or" includes any and all combinations of one or more of the associated listed items.

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term receiver may be considered synonymous to, and may hereafter be occasionally referred to, as a terminal, mobile unit, mobile station, mobile user, user equipment (UE), subscriber, user, remote station, access terminal, receiver, etc., and may describe a remote user of wireless resources in a wireless communication network. The term base station may be considered synonymous to and/or referred to as a base transceiver station (BTS), NodeB, extended Node B, femto cell, access point, etc. and may describe equipment that provides the radio baseband functions for data and/or voice connectivity between a network and one or more users.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the present invention and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements or control nodes (e.g., a scheduler located at a base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Example embodiments will now be described with like numbers referring to like parts.

Single Frequency Networks with Randomized Transmit Signal Phases

Figure 3:
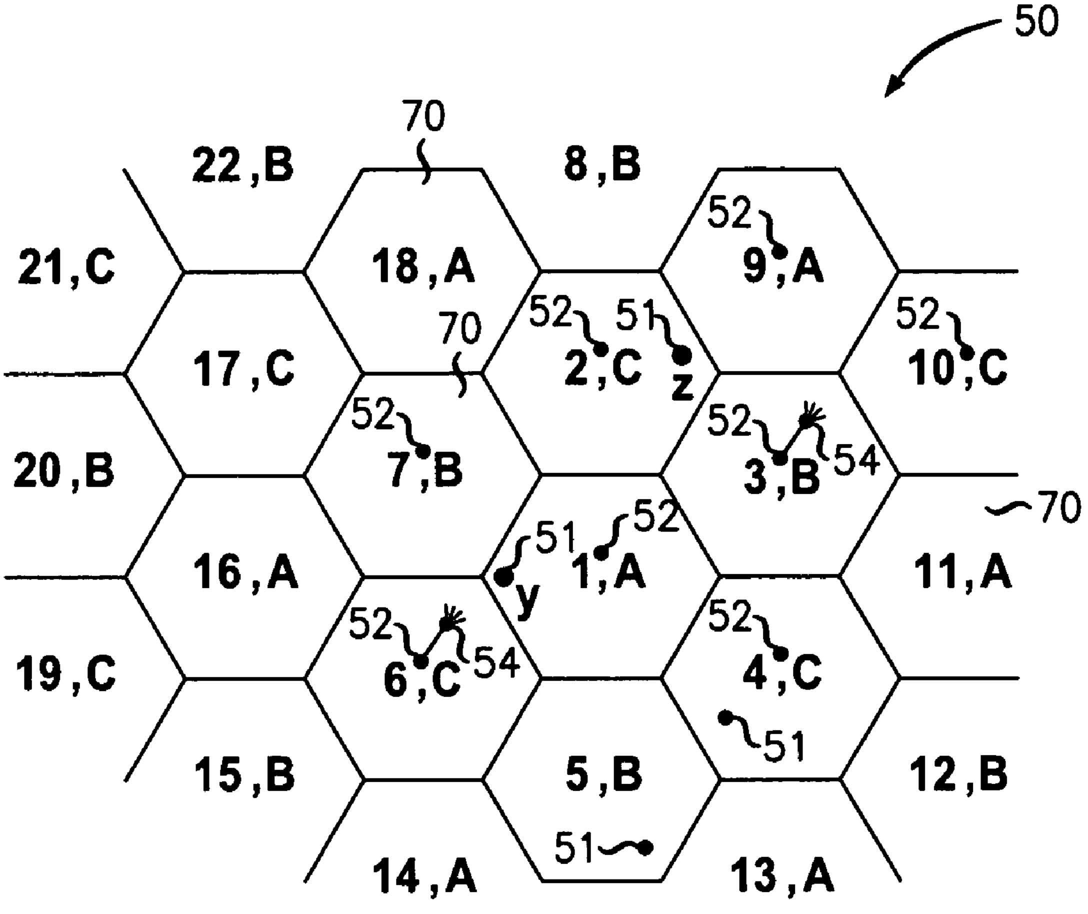
FIG. 3 shows an assignment of pilot tone sets in a single frequency network using omni-directional antennas according to a reuse parameter.
Figure 4:
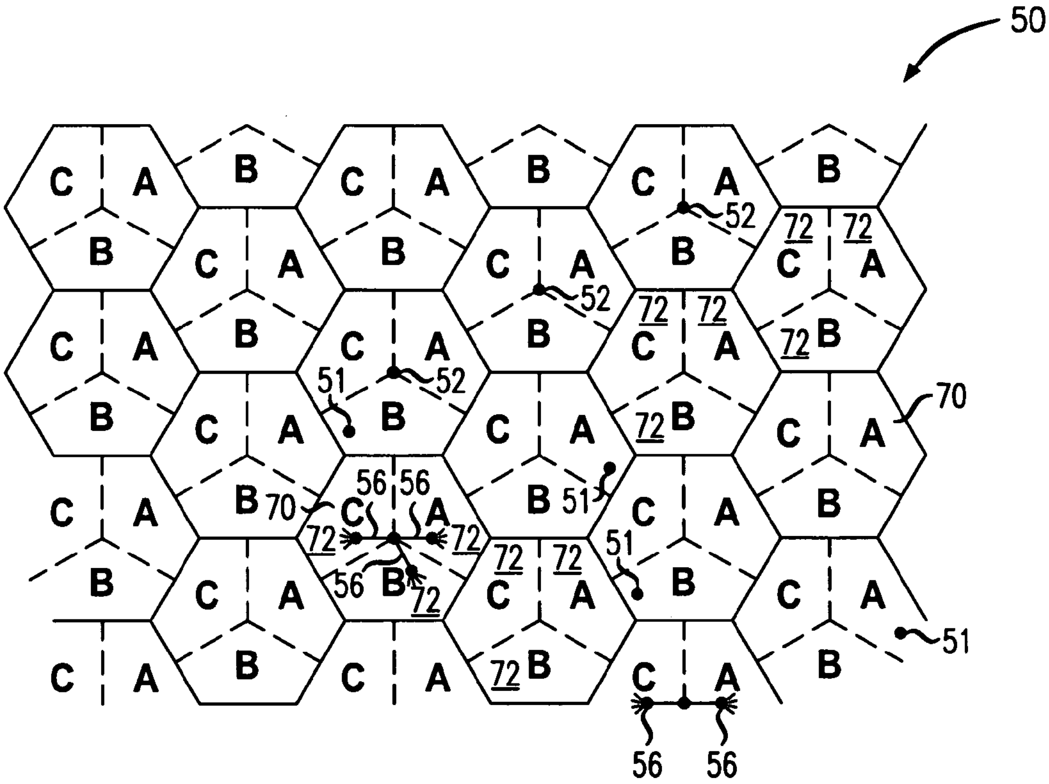
FIG. 4 is a column vector assignment in a single frequency network with three sector antennas according to a reuse parameter.

A network 50 as shown in FIGS. 3 and 4 may include one or more base stations 52 and one or more receivers 51 such as a mobile device(s).

An OFDM-based SFN 50 (as shown in FIG. 3) being used for the transmission of a broadcast application will now be discussed. The tones 58 (as shown in FIG. 1) assigned to the broadcast application are denoted by the indices 1, 2, . . . , K. As in the background, let $x^{(k)}(t)$ denote the complex data symbol being transmitted by all of the N base stations 52 participating in the SFN 50 over tone k during time-slot t. In accordance with some embodiments of the present invention, each base station 52 participating in the SFN 50 "rotates" a sub-carrier by a random phase before modulating the sub-carriers with the corresponding (complex) data symbol. That is, for i=1, 2, . . . , N, base station 52 *i* effectively transmits the complex symbol "$\exp(j\phi_{ik}(t))\, x^{(k)}(t)$" over sub-carrier k during time-slot t. The corresponding received signal is given by:

$$r^{(k)}(t) = \sum_{i=1}^{N} h_i^{(k)}(t)\exp(j\phi_{ik}(t))x^{(k)}(t) + n^{(k)}(t), \tag{4}$$

where, as before, $h_i^{(k)}(t)$ denotes the channel coefficient for the signal transmitted by the $i^{th}$ base station 52 on sub-carrier k during time-slot t, and $\phi_{ik}(t)$ denotes the corresponding random phase introduced by the $i^{th}$ base station 52. It is assumed that the random phases $\phi_{ik}(t)$ are independent of one another and distributed uniformly over the interval [0, 2π] (see FIG. 5 for example). Equation (4) indicates that from the receiver's viewpoint, the above scheme involving random phases is equivalent to having the complex data symbol $x^{(k)}(t)$ being received over an aggregate channel with channel coefficient, as shown below:

$$h_{random}^{(k)}(t) = \sum_{i=1}^{N} h_i^{(k)}(t)\exp(j\phi_{ik}(t)). \tag{5}$$

The aggregate channel coefficient $h_{random}^{(k)}(t)$ is referred to as a randomized aggregate channel coefficient. The resulting signal-to-noise ratio (SNR) for the symbol being transmitted over the $k^{th}$ tone in time-slot t, denoted by $\rho_{random}^{(k)}(t)$, equals:

$$\begin{aligned} \rho_{random}^{(k)}(t) &= |h_{random}^{(k)}(t)|^2 E\left[|x^{(k)}(t)|^2\right] / \sigma^2 \\ &= \left|\sum_{i=1}^{N} h_i^{(k)}(t)\exp(j\phi_{ik}(t))\right|^2 E\left[|x^{(k)}(t)|^2\right] / \sigma^2, \end{aligned} \tag{6}$$

Effectively, the introduction of the random phases $\phi_{ik}(t)$ modifies the individual channel coefficients "$h_i^{(k)}(t)$" to "$h_i^{(k)}$ (t) $\exp(j\phi_{ik}(t))$." The random nature of the phases $\phi_{ik}(t)$ makes it highly unlikely that destructive superposition of channel coefficients (as embodied in equations (5) and (6)) can give rise to a low aggregate value for very many tones even in flat fading conditions or in cases where the tones assigned to the broadcast application occupy a small and contiguous subset of the overall OFDM spectrum. As a result, the overall signal-to-noise ratio is no longer vulnerable to potentially destructive superposition of channel coefficients caused by relative phase differences.

Implementation of Random Transmit Phases in a Single Frequency Network

It follows from equation (4) that in an SFN 50 with randomized transmit phases, in order for a receiver to extract the transmitted symbol $x^{(k)}(t)$, the receiver should have an estimate of the randomized aggregate channel coefficient $h_{random}^{(k)}(t)$. In contrast, in an ordinary SFN, a receiver needs an estimate of the aggregate channel coefficient $h^{(k)}(t)$. Looking at the expression for $h^{(k)}(t)$, given in equation (2), it can be seen that in order to obtain an estimate of the aggregate channel coefficient $h^{(k)}(t)$, the receiver need not formulate estimates of individual channel coefficients $h_i^{(k)}(t)$ since only the sum of these individual channel coefficients is of relevance to the process of demodulation. Since the signals transmitted by different base stations 52 over any tone used by the SFN 50 simply add at the receiver 51 (see equation (1)), a simple pilot-symbol-based scheme can be used to help the receivers 51 construct estimates of the aggregate channel coefficients $h^{(k)}(t)$. The following is a brief description of such a scheme:

Referring to FIG. 1, out of the set of tones 58 being used for the broadcast application, the SFN 50 sets aside a certain subset of tones 60 to carry pilot symbols. Typically, tones 60 belonging to this subset occur periodically over the frequency spectrum spanned by the tones used by the broadcast application. FIG. 1 illustrates such an arrangement where the tones 58 used by the broadcast application span a contiguous band of frequencies.

In this scheme, all of the base stations 52 participating in the SFN transmit the symbol x=1 over the pilot tones 60 distinguished from each other by characters $P_0, P_1, \ldots, P_L$. As a consequence, for $k=P_0, P_1, \ldots, P_L$, the received signal $r^{(k)}(t)$ is given by:

$$r^{(k)}(t) = \sum_{i=1}^{N} h_i^{(k)}(t) + n^{(k)}(t) = h^{(k)}(t) + n^{(k)}(t). \tag{7}$$

That is, for each pilot tone 60 $P_0, P_1, \ldots, P_L$, the received signal equals the aggregate channel coefficient (for that tone 60) and some additive noise. This scheme wherein the symbol x=1 is transmitted over the pilot tones 60 $P_0, P_1, \ldots, P_L$ is repeated every time-slot (i.e. for each value of the time-slot index t), which enables the receiver 51 to employ simple yet effective filtering techniques to suppress noise while deriving its estimate of the channel coefficient for each pilot tone 60 $P_0, P_1, \ldots, P_L$. For instance, the receiver 51 may employ the following exponential averaging technique to obtain an estimate of the channel coefficients for different pilot tones 60:

$$\hat{h}^{(k)}(t)=(1-\alpha)\hat{h}^{(k)}(t)+\alpha r^{(k)}(t) \text{ for } k=P_0, P_1, \ldots, P_L, \text{ and } t=1, 2, \ldots, \tag{8}$$

where $\hat{h}^{(k)}(t)$ denotes the aggregate channel estimate for pilot tone 60 k (with k ranging over $P_0, P_1, \ldots, P_L$) for time-slot t and $\alpha$ is a filtering constant taking a value between 0 and 1. Once the receiver has estimates of aggregate channel coefficients for all of the pilot tones 60 in a given time-slot, estimates for aggregate channel coefficients associated with the rest of the tones 60 being used by the SFN 50, i.e. those tones 68 that are used to carry bearer traffic, can be obtained using simple interpolation techniques. For instance, for a tone 68 *k* that lies between pilot tones 60 $P_m$ and $P_{m+1}$, the aggregate channel estimate $\hat{h}^{(k)}(t)$ may be obtained as a linear combination of the aggregate channel estimates associated with the pilot tones 60 $P_m$ and $P_{m+1}$. Hereafter, the tones 68 being used to carry bearer traffic are referred to as bearer tones 68.

The reason why this scheme works in an ordinary SFN 50 is that estimates of aggregate channel coefficients for all tones used by the SFN 50 can be obtained as functions of estimates of aggregate channel coefficients associated with the pilot tones 60. There is no need for the receiver 51 to obtain estimates of channel coefficients associated with individual base stations 52. The requirement in the case of the present invention with randomized transmit phases is a little different.

Going back to equations (4) and (5), it can be seen that in the proposed scheme with randomized transmit phases, in order to demodulate the symbol $x^{(k)}(t)$ (which is transmitted on bearer tone 68 *k* in time-slot t by all base stations 52 participating in the SFN 50), the receiver 51 needs an estimate of the randomized aggregate channel coefficient $h_{random}^{(k)}(t)$. As evident from equation (5), because of the fact that channel coefficients associated with different tones and different base stations 52 undergo distinct random rotations, in order to construct an estimate of the randomized aggregate channel coefficient $h_{random}^{(k)}(t)$ for tone k, the receiver 51 needs to obtain an estimate of the individual channel coefficient $h_i^{(k)}(t)$ for each base station 51 *i* within its hearing range, rotate each such estimate by the corresponding random phase $\phi_{ik}(t)$ and then add them together to form its estimate of $h_{random}^{(k)}(t)$. If the random phases $\phi_{ik}(t)$ are generated using a pseudo-random number generation algorithm that is known to and is in synch with the receiver 51, the latter can exactly replicate the random phases used by the base stations 52 in the SFN 50 to provide random rotations to the channel coefficients associated with different tones. (A method for random phase generation will be presented later in this section.) Thus, a desired function for the receiver 51 is to be able to estimate the individual channel coefficients $h_i^{(k)}(t)$.

If the receivers 51 are to be able to obtain individual channel coefficients associated with different base stations 52, the base stations 52 have to use distinct sets of pilot tones 60 so that there is no interference between signals from different base stations 52 at the receiver 51 when the receiver 51 attempts to construct an estimate of the channel coefficient (for a pilot tone 60) associated with a given base station 52. However, if a distinct set of pilot tones 60 were set aside for each base station 52 participating in an SFN 50, tones 58 to allocate to different base stations 52 would quickly run out. As a consequence, there is a conflicting requirement: On one hand, distinct sets of pilot tones 60 would need to be assigned to different base stations 52 so that receivers 51 can obtain estimates of individual channel coefficients associated with all base stations 52 in their respective hearing range; on the other, the total number of tones 60 to be used as pilot tones 60 need to be limited to a relatively small fraction of the overall set of tones 58 available for the SFN 50 so that we have adequate capacity to carry the bearer traffic. This conflicting requirement is addressed by employing pilot tone reuse.

Note that from a practical viewpoint, in order to construct an estimate of the randomized aggregate channel coefficient $h_{random}^{(k)}(t)$, a receiver 51 does not need individual channel coefficients for all base stations 52 in the SFN 50. As long as it has the individual channel coefficients (and the corresponding random phases) associated with the base stations whose signals are strong enough when they reach the receiver 51, the receiver 51 should be able to construct a good-quality estimate of the randomized aggregate channel coefficient. Thus, with reference to FIG. 2, the idea is to use a (relatively) small number of pilot tone sets 62, 64, 66 and assign them to different base stations 52 in such a manner that at points in the coverage area of the SFN 50 where signals from multiple base station antennas 54, 56 are received, the pilot tone sets 62, 64, 66 assigned to those base stations 52 are likely to be distinct. This assignment is analogous to the assignment of frequency bands in classical TDMA-based cellular systems such as GSM. In these latter systems, frequency bands from a limited set available for use in the cellular system are assigned to different cells or sectors in such a manner that if signals from any set of base stations can reach some points (typically on the edges of cells) at significant levels, those base stations are likely to be assigned different frequency bands. This keeps them from interfering with one another.

In accordance with some embodiments, to ensure that if signals from any given set of base station 52 antennas 54, 56 can reach some points at significant levels, those base station antennas 54, 56 are assigned distinct pilot tone sets 64, 66, for example. As a result, a receiver device 51 that receives strong signals from a number of base stations 52 is able to obtain individual channel coefficients for each of those base stations 52. Because of the fact that each pilot tone set 62, 64, 66 is assigned to multiple base stations 52, the individual channel coefficients will have components associated with multiple base stations 52. However, typically, most of them will be significantly weak compared to the dominant one among them. The number of distinct pilot tone sets 62, 64, 66 assigned to different base stations 52 in the SFN 50 is referred to as the "reuse parameter." Illustrated examples of this concept are described below.

Figure 2:
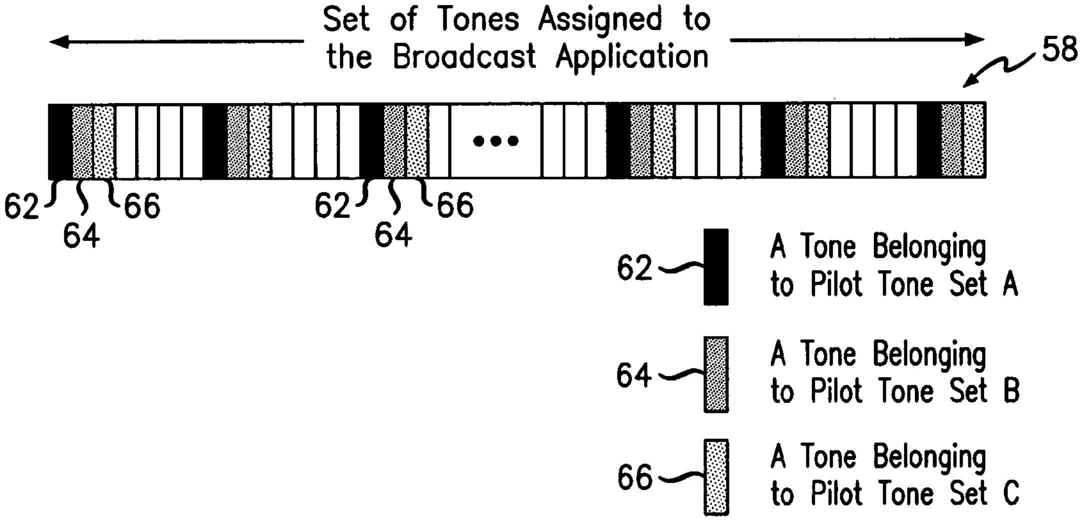
FIG. 2 is an illustration of a span of a continuous band of frequencies where pilot tones belonging to various sets are illustrated according to a reuse parameter.

FIG. 2 illustrates a possible structure of pilot tone sets 62, 64, 66 which can be assigned to different base stations 52 in accordance with a reuse pattern with reuse parameter equal to 3. As shown in FIG. 2, there are three sets 62, 64, 66 of pilot tones, labeled A, B and C, spread over the spectrum 58 assigned to the broadcast application. Consistent with FIG. 1, it is assumed that the pilot tone set A 62 consists of the tones $P^{(A)}_1, P^{(A)}_2, \ldots, P^{(A)}_L$; pilot tone set B 64 consists of tones $P^{(B)}_1, P^{(B)}_2, \ldots, P^{(B)}_L$; and pilot tone set C 66 consists of tones $P^{(C)}_1, P^{(C)}_2, \ldots, P^{(C)}L$.

FIG. 3 shows a cellular 70 arrangement of the base stations 52 participating in an SFN 50. It is assumed that all base stations 52 have omni-directional antennas 54, which would result in a hexagonal cell-pattern under ideal conditions. The base stations 52 (and the corresponding cells 70) are numbered 1, 2, 3, . . . , etc. In FIG. 3, a letter "A," "B" or "C" appears next to each number representing the identifier of the corresponding base station 52. This letter refers to the pilot tone set 62, 64, 66 that has been assigned to the corresponding base station 52 antenna 54. Thus, base station 52 1 has been assigned the pilot tone set A 62, base station 52 2 has been assigned the pilot tone set C 66, and so on.

The point "y" in the coverage area of cell 70 1 is described to illustrate an example. Point "y" may show the location of a receiver 51 in the network 50. Since y is close to that cell's boundary with cells 70 6 and 7, it is likely to receive relatively strong signals from base stations 52 6 and 7 in addition to those from base station 52 1. Since base stations 52 1, 6 and 7 have been assigned pilot tone sets A 62, C 66 and B 64, respectively, their signals do not interfere with one another when the receiver 51 at point y carries out estimation of individual channel coefficients. Similarly, a receiver 51 located at point z in cell 70 2's coverage area receives signals from base station 52 2 and base station 52 9. Once again, it is seen that these base stations 52 use distinct pilot tone sets 62, 66 (C and A, respectively) so that there is no interference between these signals in the computation of individual channel coefficients.

FIG. 3 illustrates the concept of pilot-tone-set reuse in an SFN 50 with omni-directional base station antennas 54. Similar pilot-tone-set reuse can be implemented in SFNs 50 with sectorized antennas 56 as well. FIG. 4 illustrates such an example where each base station 52 has a 3-sector antenna 56 so that each cell, i.e. the coverage area of a base station, comprises 3 divisions referred to hereafter as cell sectors. Note that each cell sector corresponds to an antenna sector of the corresponding base station. (The pilot tone sets assigned to different sectors have been shown in FIG. 4, most of the base station and sector 72 identifiers have been omitted to avoid cluttering of the figure.) With sectorized base station antennas 56, each sector 72 of a base station What this means is that when a receiver 51 processes a pilot tone 60 belonging to pilot tone set A 62 to estimate the corresponding channel coefficient, the received signal consists of the sum of individual channel coefficients associated with all of the base stations 52 belonging to the reuse group associated with the pilot tone set A 62 and some additive noise. (In a similar manner, the received signal for a tone belonging to the pilot tone set B 64 or C 66 would consist of the sum of individual channel coefficients associated with all the base stations 52 in the corresponding reuse groups and some additive noise.) Since the further processing (e.g. filtering) that takes place in the estimation of channel coefficients is based on such received signals, it is clear that channel coefficients associated with individual base stations 52 belonging to the same reuse group cannot be separated. This is not a serious problem at all, since in any carefully designed reuse pattern there would typically be one dominant channel coefficient among all those associated with base stations 52 assigned the same pilot tone set 62, 64, 66, and it is this dominant channel component and its phase characteristics that affect system performance. However, the fact that individual channel coefficients associated with base stations 52 in the same reuse group cannot be separated has an important implication in the generation of randomized transmit phases as described in the next section.

Generation of Randomized Transmit Phases

Recall that in some embodiments of the present invention, the randomized transmit phases introduced by the base station 52 transmitters are generated in a synchronous manner by all the receivers 51 listening to the broadcast/multicast application. This means that a newly tuned receiver 51 should be able to quickly lock on to the algorithm being used to generate the random phases and replicate them locally. There are many methods of pseudo-random number generation that can serve the purpose. Example methods are described.

In the theoretical discussion given in the section above titled "Single Frequency Networks with Randomized Transmit Signal Phases," it is assumed that the random transmit 52 is to be assigned a different pilot tone set 62, 64, 66. It is easy to see that the assignment of pilot tone sets 62, 64, 66 shown in FIG. 4 would ensure that if a receiver device 51 receives strong signals from multiple sectors 72 (of the same cell or different cells), those sectors 72 are likely to be using different pilot tone sets 62, 64, 66.

The pilot-tone-set reuse patterns presented in FIGS. 3 and 4 have an associated reuse parameter value of 3, i.e., each of them uses 3 pilot tone sets 62, 64, 66. It is envisioned that pilot-tone-set reuse patterns with different reuse parameter values can also be used. For example, some embodiments could deploy the widely discussed reuse pattern (for cellular networks with omni-directional antennas 54) with reuse parameter 7. Such a reuse pattern would entail the creation of 7 distinct pilot tone sets, which could lead to a significant reduction in the tones 68 available for the bearer traffic. In general, it may be useful to keep the reuse parameter to as low a value as possible. A reuse parameter value of 3 may strike a good compromise—it keeps the overheads associated with pilot tones 60 within reasonable limits while allowing nearly maximum benefits from randomized transmit phases.

The reuse of pilot tone sets 62, 64, 66 as described above has an interesting implication as far as estimation of channel coefficients is concerned. As an example, consider the reuse pattern presented in FIG. 3. In that reuse pattern, only those base stations 52 that have been assigned pilot tone set A 62 transmit their pilot signals (i.e. complex signals x=1) over the tones belonging to set A 62. Let $S_A$ denote the set of all the base stations 52 that have been assigned pilot tone set A 62. We refer to the set $S_A$ as the reuse group associated with the pilot tone set A 62. Then, for k $\in$ A, (i.e. for a pilot tone k that belongs to the pilot tone set A 60), the received signal is given by:

$$r^{(k)}(t) = \sum_{i \in S_A}^{N} h_i^{(k)}(t) + n^{(k)}(t). \quad (9)$$

phases $\phi_{ik}(t)$ corresponding to different base stations (i.e. different values of i), or different tones (i.e. different values of k) or different time-slots (i.e. different values of t) were independent and uniformly distributed over [0, 2π]. In an SFN 50 of reasonable complexity (in terms of the number of base stations 52, or tones 58 allocated to the broadcast applications being carried by the SFN 50), it may not be possible to generate truly independent random phases for each base station 52—tone 58—time-slot combination, which can be replicated exactly at each receiver 51 in a synchronous manner. We note, however, that it is not necessary to generate truly independent random phases for each base station 52—tone 58—time-slot combination. A compact, Linear-Feedback-Shift-Register (LFSR) based scheme for pseudo-random number generation that can be replicated at each receiver should provide adequate "randomness" to derive all the benefits of transmit phase randomization.

Figure 5:
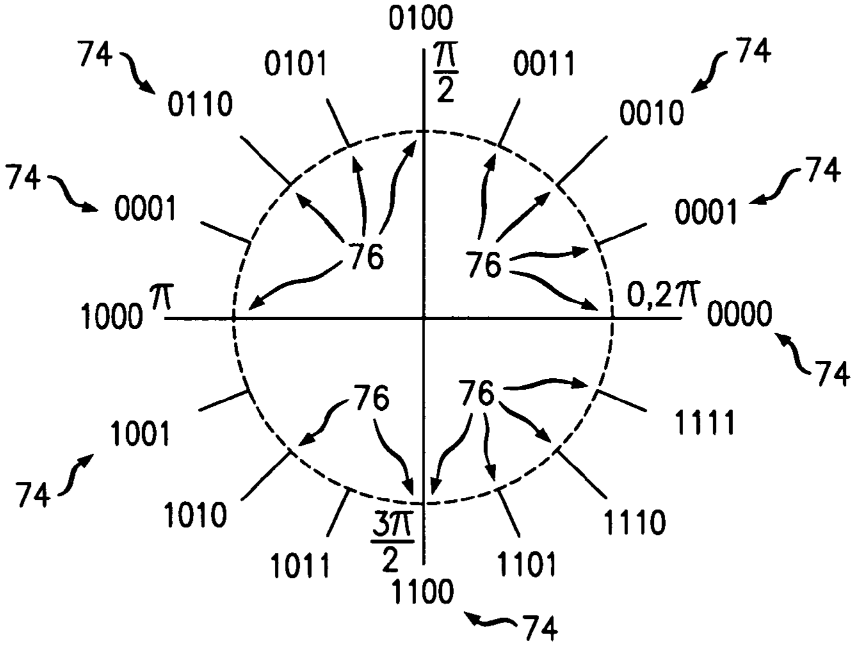
FIG. 5 illustrates design of the angle phases.

Since standard LFSR-based pseudo-random number generators provide binary outputs, the random phase angles $\phi_{ik}(t)$ are discretized. While the interval [0, 2π] can be discretized into any convenient number of levels, for the purpose of the present example it is assumed that this interval is divided into 16 discrete levels. FIG. 5 shows this discretization and the 4-bit binary 74 representation of each of the sixteen levels associated therewith. The idea here is that if the pseudo-random number output for a given phase is a 4-bit number 74 n, the corresponding phase angle 76 is the one indicated by the number 74 n in FIG. 5. For instance, if the pseudo-random number generator outputs the 4-bit binary number "0101" for the phase angle $\phi_{ik}(t)$, the latter is set equal to 5π/8 as indicated in FIG. 5.

In view of the phase-discretization described above, a 4-bit random number 74 for each random phase is generated. It is assumed all along that the random phase $\phi_{ik}(t)$ is a function of three parameters—i (the base station index), k (the tone index) and t (the time-slot). Given that, as indicated by equation (9), separate channel coefficients cannot be associated with base stations 52 that are assigned the same pilot tone set 62, 64, 66 (i.e. they belong to the same reuse group), there is no point in generating distinct random phases for such base stations 52. Therefore, a restriction is imposed that for each given pair (k,t) representing a specific combination of tone and time-slot, all base stations 52 that are assigned the same pilot tone set 62, 64, 66 will use the same random phase. Thus, the random phase $\phi_{ik}(t)$ becomes a function of u(i), k and t, where u(i) denotes the pilot tone set 62, 64, 66 assigned to base station i. Formally, this relationship is written as:

$$\phi_{ik}(t) = f(u(i),k,t). \quad (10)$$

Assuming that there is a reuse pattern with reuse parameter equal to 3, this means that three random phases are needed for each combination of tone index k and time-slot t.

Typically, a broadcast/multicast application carried over an SFN 50 would use a few tens of tones 68 per time-slot to carry the associated bearer traffic. Viewed simplistically, this would mean that during each time-slot a corresponding number (i.e. a few tens) of random phases is generated for each reuse group. For example, if the broadcast application uses 100 tones 68 for bearer traffic, each time-slot needs to have generated 100 random phases for the base stations 52 in reuse group $S_A$, another 100 random phases for the base stations 52 in reuse group $S_B$ and a third set of 100 random phases for those using in reuse group $S_C$. Generation of such a large number of "independent" pseudo-random numbers can be rather cumbersome; nor is it necessary. Only as many independent pseudo-random numbers are needed as are necessary to ensure that, at the receiver 51, each contiguous segment of data symbols 80 (see, for example, FIG. 7) has an adequate variety of independent phase combinations. Since the data associated with any traffic stream (e.g. a broadcast/multicast application) is typically interleaved before it is used to modulate the tones 58 of the OFDM system assigned to that stream, the effect of interleaving while assigning a limited set of random phases to the tones 58 being used by the SFN 50 is considered. Each reuse group can make do with 8 to 16 independent pseudo-random numbers 78 per time-slot provided the corresponding phases are judiciously assigned to bearer tones 68. The following examples will clarify what is intended here.

Example 1

Figure 6:
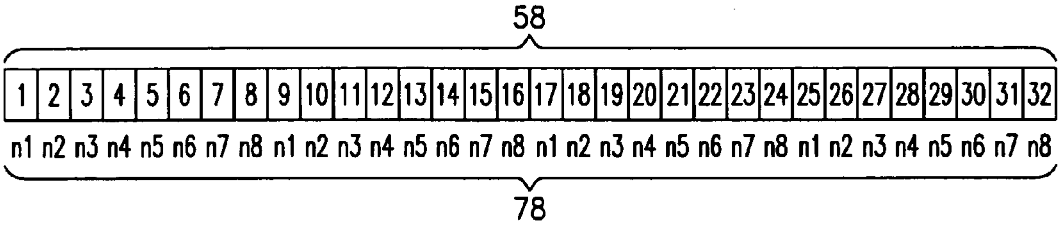
FIG. 6 illustrates an assignment of pseudo random numbers and phases to bearer tones according to one example embodiment.

In this example it is assumed that the broadcast application uses 32 bearer tones 68 per slot and that the data is not interleaved before it is used to modulate the assigned tones 68. It is assumed that 8 pseudo-random numbers 78 (see FIG. 6) are used by a base station 52 in every slot to generate the corresponding random phases. These eight pseudo-random numbers 78 and the corresponding phases are denoted by n1, n2, . . . , n8; the 32 data symbols 80 (see FIG. 7) that are transmitted over the 32 tones 58 are denoted by d1, d2, . . . , d32. FIG. 6 shows the assignment of these pseudo-random numbers 78 (and the corresponding phases) to the 32 tones 58 at the transmission end. The tones 58 are indicated simply by the corresponding numbers.

Since there is no interleaving of data symbols 80 before they are assigned to the tones 58, data symbol 80 d1 is assigned to tone 58 1, 80 d2 to tone 58 2, and so on. At the receiver 51, when the data symbols 80 are placed in the original order (which is the same as the transmission order) for further processing, any contiguous segment of data symbols 80 has maximal diversity of random phases 78. For example, any contiguous segment of length 8 or less will have as many distinct random phases 78 as the number of data symbols 80 in that segment. As a result, the decoding process at the receiver 51 derives maximal benefit from phase randomization.

Example 2

Figure 7:
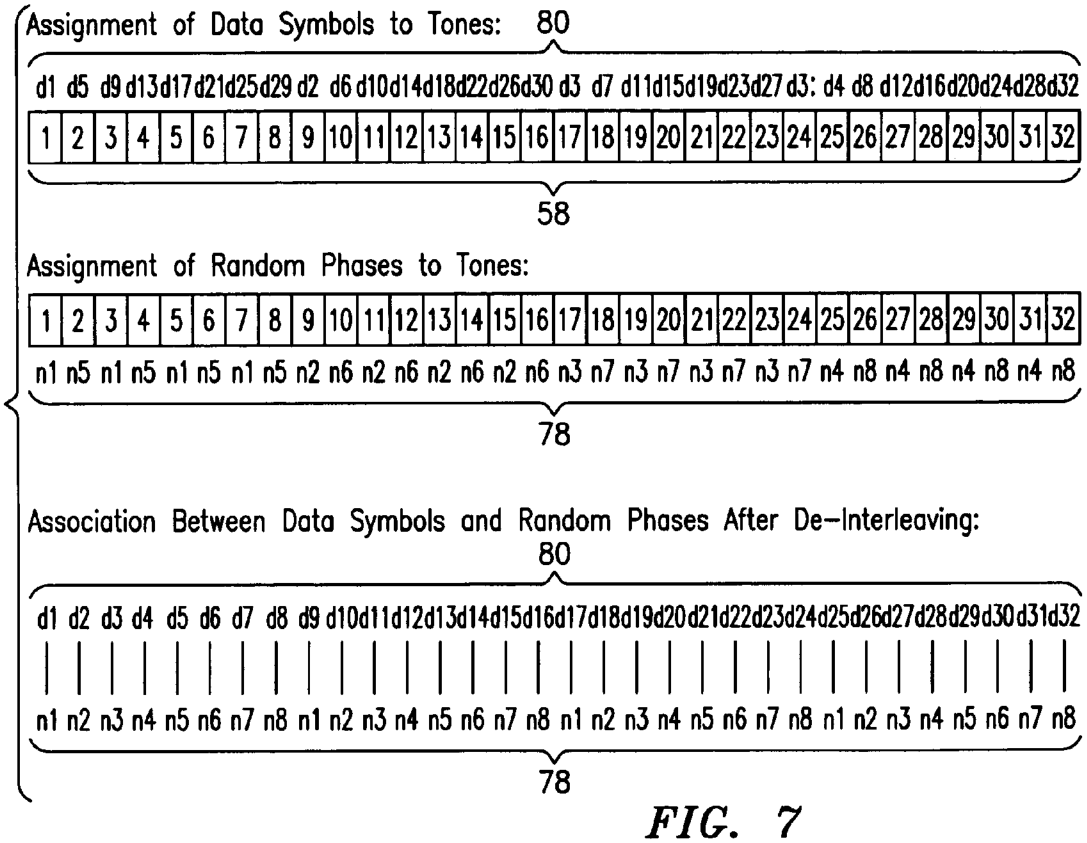
FIG. 7 illustrates assignment of data symbols and random phases to tones in a second example embodiment.

In this example also, it is assumed that the broadcast application uses 32 bearer tones 68 per slot; however, the data carried over these slots is interleaved using a simple 8×4 rectangular interleaver, where the 32 data symbols 80 are read row-wise into an 8×4 array and output column-wise when assigning them to the 32 bearer tones 68. This interleaving results in the 32 data symbols 80 (d1, d2, . . . , d32) being assigned to the 32 tones 58 as shown at the top of FIG. 7. The 8 random phases 78 (denoted by n1, n2, . . . , n8) are assigned to the 32 tones 58 as shown in the middle part of FIG. 7. When the data symbol 80 are de-interleaved at the receiver 51 (so that they are in the original order), the association between data symbols 80 and the random phases 78 is as shown at the bottom of FIG. 7, yielding maximal diversity of random phases 78 in any contiguous data segment.

Assuming that a base station needs to generate eight random phases 78 (each represented by a 4-bit number 74) for every time-slot, the base station can use a 32-bit LFSR to generate the desired random numbers. Two example methods that can be used for this purpose are described here. These methods are being presented as examples of how the desired random phases 78 may be generated; those skilled in the art can find alternative methods that can be employed in place of the methods presented here. It is assumed throughout this section that the system being described employs pilot-tone-set reuse with reuse parameter 3 and that the three pilot tone sets 62, 64, 66 are referred to as A, B, and C, respectively. In both methods, each base station maintains an LFSR.

Figure 8:
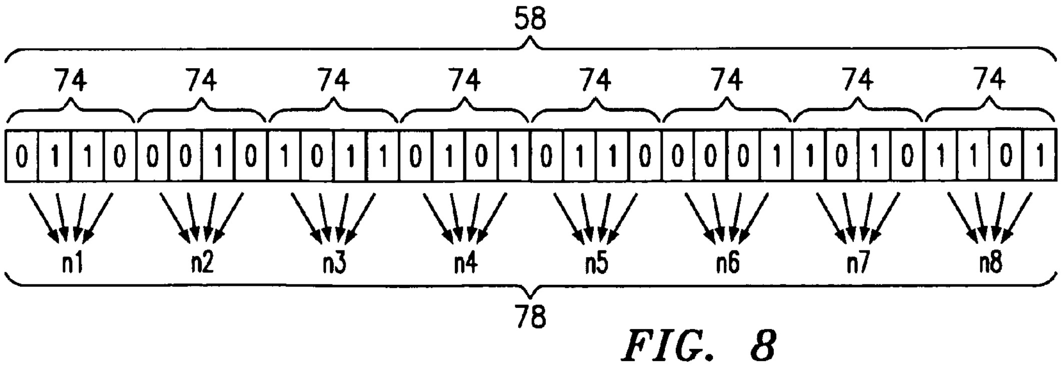
FIG. 8 illustrates an association of a linear-feedback-shift-register (LFSR) bit positions and random phases.

In method 1, the LFSRs maintained by all base stations 52 belonging to reuse group $S_A$ have identical contents at all times. That is, they are simultaneously initialized to the same value and then perform the shift operation once every time-slot so that their contents are identical at all times. Similarly, all base stations 52 belonging to reuse group $S_B$ have identical contents at all times, and so do all those belonging to reuse group $S_C$. The contents of the LFSRs associated with base stations 52 belonging to different reuse groups are initialized to different values so that the pseudo-random number streams they produce (through the shift operation) appear independent of one another. Periodically, e.g. once every 100 ms or so, the base stations 52 belonging to the same reuse group transmit the current contents of their LFSR over a common broadcast channel. The broadcasts of LFSR contents associated with base stations 52 belonging to different reuse groups are carried out over distinct logical channels to avoid interference. During each time-slot, every base station 52 performs the shift operation on its LFSR and then reads the LFSR's contents to determine the eight random phases 78 as shown in FIG. 8. (The "taps" and the feedback aspect of the LFSR have not been shown in FIG. 8.)

As shown in FIG. 8, bit positions 1, 2, 3, 4 map to the random phase 78 n1, bit positions 5, 6, 7, 8 map to the random phase n2, and so on. Thus, if the contents of bit positions 1, 2, 3, 4 are "0110" (as shown in FIG. 8), the base station 52 sets the random phase 78 n1 equal to 3π/4 as indicated by the mapping given in FIG. 5. In this manner, all of the eight random phases 78 are determined by a base station 52 during each time-slot. These phases 78 are used to rotate the corresponding tones 58 before they are modulated by the data symbols 80 to be carried over the tones 58. In this method, the same mapping between LFSR bit positions and random phases 78 is used by all base stations 52. As explained later, if method 1 is used to generate the random phases 78, each receiver maintains three parallel LFSRs—one to track the random phases 78 generated by base stations 52 in reuse group $S_A$, one for those in reuse group $S_B$ and a third for those in reuse group $S_C$.

Figure 9A:
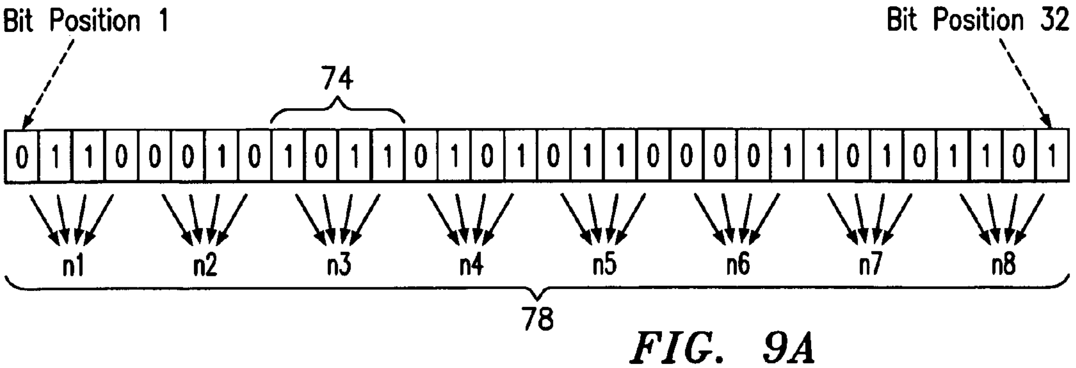
FIG. 9A illustrates an association of LFSR bit positions and random phases used by base stations assigned pilot tone set A.
Figure 9B:
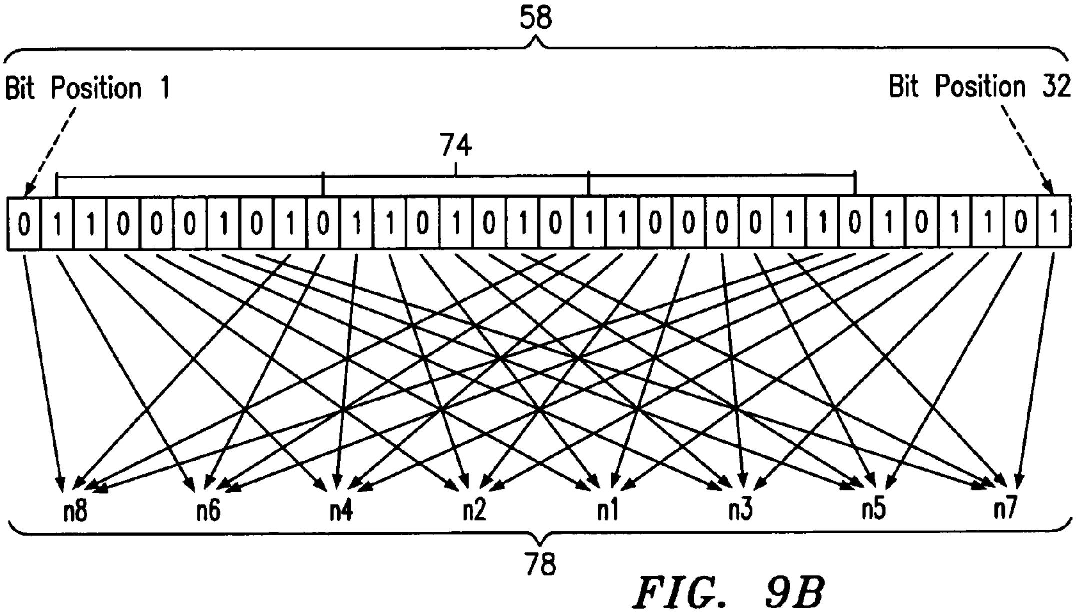
FIG. 9B illustrates an association of LFSR bit positions and random phases used by base stations assigned pilot tone set B.
Figure 9C:
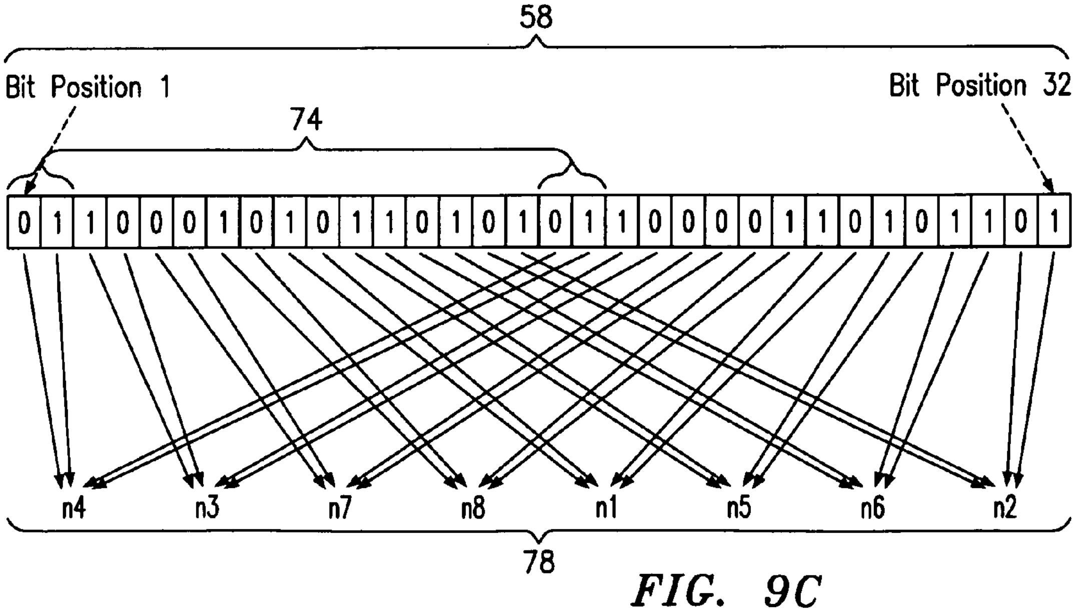
FIG. 9C illustrates an association of LFSR bit positions and random phases used by base stations assigned pilot tone set C.

In method 2, each base station 52 maintains one LFSR, and all of these LFSRs have identical contents at all times. That is, all base stations 52, regardless of the reuse group they belong to, simultaneously initialize their respective LFSRs to the same value and then perform the shift operations once every time-slot so that their contents are identical at all times. However, in order to generate mutually "independent" random phases 78, base stations 52 using different pilot tone sets use different mappings between LFSR bit positions and random phases 78. FIGS. 9A-C show how the bit positions are mapped to the 4-bit numbers representing different random phases 78 by base stations 52 associated with the three pilot-tone-sets 62, 64, 66.

The mappings between bit positions and 4-bit numbers 74 representing random phases 78 as shown in FIGS. 9A-C have been designed such that no 4-bit number 74 representing a random phase 78 for one set of base stations 52 (e.g. those in reuse group $S_A$) has any bit position in common with the 4-bit number 74 representing the same random phase 78 for another set of base stations 52 (e.g. those in reuse groups $S_B$ or $S_C$.) For instance, base stations 52 in reuse group $S_A$ use bit positions 1,2,3,4 to represent the 4-bit number 74 associated with phase 78 n1 whereas those in reuse group $S_B$ use the bit positions 5,13,21,29 while those in reuse group $S_C$ use the bit positions 9,10,25,26 to represent n1. This is expected to minimize potential dependencies between the random phases generated using the same 32-bit LFSR.

In method 2, all base stations 52 periodically transmit the current contents of their LFSR on a common broadcast channel. Note that in this case a single broadcast channel is needed since the LFSR contents at all base stations 52 are identical at all times. Also, a receiver 51 needs to maintain a single LFSR to track the contents of the base station 52 LFSRs.

Summary of Transmitter Operation

The operation of a base station 52 transmitter in some embodiments in accordance with the present invention may be summarized as follows:

Each base station 52 transmitter maintains an LFSR, whose contents are initialized to a value in step S170 so that the base stations 52 belonging to the same reuse group have the same LFSR contents. (Recall that if the system is using method 2 to generate random phases 78, all base station LFSRs, not just those that belong to the same reuse group, have the same contents at all times.) At the beginning of each time-slot, each base station transmitter updates the contents of its LFSR by performing the shift operation. The new contents are then read to determine the random phases 78 associated with the bearer tones 68 used for the broadcast/multicast application being carried by the system 50. These random phases 78 are then used to rotate the corresponding bearer tones 68 before they are modulated by the respective complex data symbols 80. The pilot tones 60 to be used by the base station 52 during the time-slot are neither rotated by random phases 78, nor modulated by any data symbols 80 (which is equivalent to having the corresponding data symbol equal to 1.) The bearer tones 68 as well as pilot tones 60 to be transmitted during the time-slot are then assembled into an OFDM symbol that is handed to lower-layer hardware for further processing before it is transmitted over the antenna 54, 56. This process is repeated every time-slot. In addition, periodically, such as once every 100 ms, the base station transmitter transmits the current contents of its LFSR over a broadcast channel assigned for this purpose.

Receiver Operation

Receiver 51 operation in accordance with some embodiments of the present invention assuming a pilot tone reuse pattern with reuse parameter 3 is described. First, how a receiver 51 would have to operate if the system were operating according to method 1 described above is described. Later, how receiver 51 operation would have to change if the system were to operate according to method 2 is described.

If the system is operating according to method 1, all base stations 52 in a given reuse group have identical LFSR contents at all times; however, the LFSR contents for base stations 52 in different reuse groups differ from each other. Thus, a receiver 51 maintains three LFSRs, one for each of the three reuse groups corresponding to the three pilot tone sets 62, 64, 66. There is a flag associated with each of these three LFSRs. The flag associated with an LFSR can be in an "off" state or an "on" state. All three flags are initialized to be in the off state. It is assumed that each pilot tone set 62, 64, 66 contains L pilot tones and that the pilot tones 62 in set A are denoted by $P_1^{(A)}, P_2^{(A)}, \ldots, P_L^{(A)}$; those in set B 64 are denoted by $P_1^{(B)}, P_2^{(B)}, \ldots, P_L^{(B)}$, and so on. The receiver 51 maintains a channel coefficient estimate for each pilot tone 60 in each of the three pilot tone sets 62, 64, 66. These channel coefficient estimates (to be referred to as pilot tone channel estimates) are denoted by $\hat{h}_{P1}^{(A)}, \hat{h}_{P2}^{(A)}, \ldots, \hat{h}_{PL}^{(A)}, \hat{h}_{P1}^{(B)}, \hat{h}_{P2}^{(B)}, \ldots, \hat{h}_{PL}^{(B)}$, and $\hat{h}_{P1}^{(C)}, \hat{h}_{P2}^{(C)}, \ldots, \hat{h}_{PL}^{(C)}$. All of these pilot tone channel estimates are initialized to 0.

The receiver 51 begins by monitoring the broadcast channels over which each base station 52 transmits the current contents of its LFSR. (Recall that there are three such broadcast channels, one for base stations in reuse group $S_A$, one for those in reuse group $S_B$ and one for those in reuse group $S_C$.) When the receiver 51 successfully decodes the LFSR contents being transmitted over one of these broadcast channels, it enters the decoded contents into the corresponding LFSR and changes the state of the associated flag to "on." Even after acquiring the LFSR contents being transmitted over one of the broadcast channels (indicated by the fact that the flag associated with at least one of the LFSRs is in the "on" state), the receiver 51 continues to monitor all of these channels. If the LFSR contents being transmitted over a broadcast channel have been already decoded (and entered into the corresponding LFSR) by the receiver 51, this continued monitoring allows the receiver 51 to ensure that there is no error in decoding the LFSR contents being transmitted over that channel; or, in case an error is detected, it allows the receiver 51 to rectify it. Whenever the receiver can successfully decode the LFSR contents being transmitted over a broadcast channel for the first time, it enters them into the corresponding LFSR and changes the state of the associated flag to "on."

Once at least one of the flags is in the "on" state, the receiver performs the following actions during each time-slot:

The receiver 51 performs the shift operation on each of the LFSRs whose associated flag is in the "on" state. The updated contents of these LFSRs are then read to determine the random phases 78 that have been applied to bearer tones 68 by the corresponding base stations 52. For instance, if the state of the flag associated with the LFSR corresponding to reuse group $S_A$ is "on," the receiver 51 performs the shift operation on that LFSR at the beginning of a time-slot, and then reads the updated contents of that LFSR to determine the random phases 78 that have been applied by base stations 52 in reuse group $S_A$ to bearer tones 68 during the current time-slot. These random phases 78 are denoted by $\phi_k^{(A)}$, where k stands for the index of the bearer tone 68. The random phases 78 applied by base stations 52 in reuse group $S_B$ and those in reuse group $S_C$ are denoted by $\phi_k^{(B)}$ and $\phi_k^{(C)}$, respectively.

Next, for each LFSR with the associated flag in the "on" state, the receiver 51 updates the corresponding pilot tone channel estimates using equation (8). Thus, for example, if the flag associated with the LFSR corresponding to reuse group $S_A$ is in the "on" state, the receiver updates the pilot tone channel estimates $\hat{h}_{P1}^{(A)}, \hat{h}_{P2}^{(A)}, \ldots, \hat{h}_{PL}^{(A)}$ as shown below:

$$\hat{h}_{Pk}^{(A)} \leftarrow (1-\alpha)\hat{h}_{Pk}^{(A)} + \alpha r_{Pk}^{(A)}, \text{ for } k=1, \ldots, L \tag{11}$$

where $r_{Pk}^{(A)}$ denotes the received signal associated with the pilot tone $P_k^{(A)}$ during the current time-slot, and α is a suitable filtering constant, which takes a value between 0 and 1.

Then, for each LFSR with the associated flag in the "on" state, the receiver uses the just computed pilot tone channel estimates to compute the corresponding partial bearer tone channel estimates. For instance, if the LFSR corresponding to reuse group $S_A$ is in the "on" state, the receiver uses the pilot tone channel estimates $\hat{h}_{P1}^{(A)}, \hat{h}_{P2}^{(A)}, \ldots, \hat{h}_{PL}^{(A)}$ to compute the partial bearer tone channel estimates $\hat{h}_k^{(A)}$ for each bearer tone 68 *k* being used for the broadcast/multicast application. Suitable linear combinations may be used to calculate partial bearer tone channel estimate from pilot tone channel estimates. For instance, if bearer tone 68 *k* is between pilot tones 60 $P_2^{(A)}$ and $P_3^{(A)}$, the partial bearer tone channel estimate $\hat{h}_k^{(A)}$ may be computed as the linear combination:

$$\hat{h}_k^{(A)} = (1-\beta_k^{(A)})\hat{h}_{P2}^{(A)} + \beta_k^{(A)}\hat{h}_{P3}^{(A)}, \tag{12}$$

where $\beta_k^{(A)}$ is a constant between 0 and 1, which depends on the relative distance between the bearer tone k and the pilot tones $P_2^{(A)}$ and $P_3^{(A)}$.

Once partial bearer tone channel estimates are calculated for all LFSRs with the associated flag in the "on" state, the receiver 51 uses these partial bearer tone channel estimates and the random phases 78 determined earlier to compute aggregate channel coefficient estimates for all bearer tones 68. For example, if the flag associated with the LFSR corresponding to reuse group $S_A$ alone is in the "on" state, then $\hat{h}_k$, the aggregate channel coefficient estimate for bearer tone 68 k, is computed as:

$$\hat{h}_k = \hat{h}_k^{(A)} \exp(j\,\phi_k^{(A)}) \tag{13a}$$

where $\hat{h}_k^{(A)}$ is the partial bearer tone channel estimate for bearer tone 68 *k* (corresponding to reuse group $S_A$), and $\phi_k^{(A)}$ is the random phase by which all base stations 52 in reuse group $S_A$ have rotated the bearer tone 68 *k* before modulating it with the corresponding data symbol 80. Note that $\phi_k^{(A)}$ is determined from the current contents of the corresponding shift register in a previous step.

Similarly, if the flags associated with the LFSRs corresponding to reuse groups $S_A$ and $S_B$ are in the "on" state but that corresponding to reuse group $S_C$ is "off," the aggregate channel coefficient estimate for bearer tone 68 *k* is computed as:

$$\hat{h}_k = \hat{h}_k^{(A)} \exp(j\,\phi_k^{(A)}) + \hat{h}_k^{(B)} \exp(j\,\phi_k^{(B)}). \tag{13b}$$

If the flags associated with all three LFSRs are in the "on" state, the aggregate channel coefficient estimate for bearer tone 68 *k* is computed as:

$$\hat{h}_k = \hat{h}_k^{(A)} \exp(j\,\phi_k^{(A)}) + \hat{h}_k^{(B)} \exp(j\,\phi_k^{(B)}) + \hat{h}_k^{(C)} \exp(j\phi_k^{(C)}). \tag{13c}$$

Figure 10:
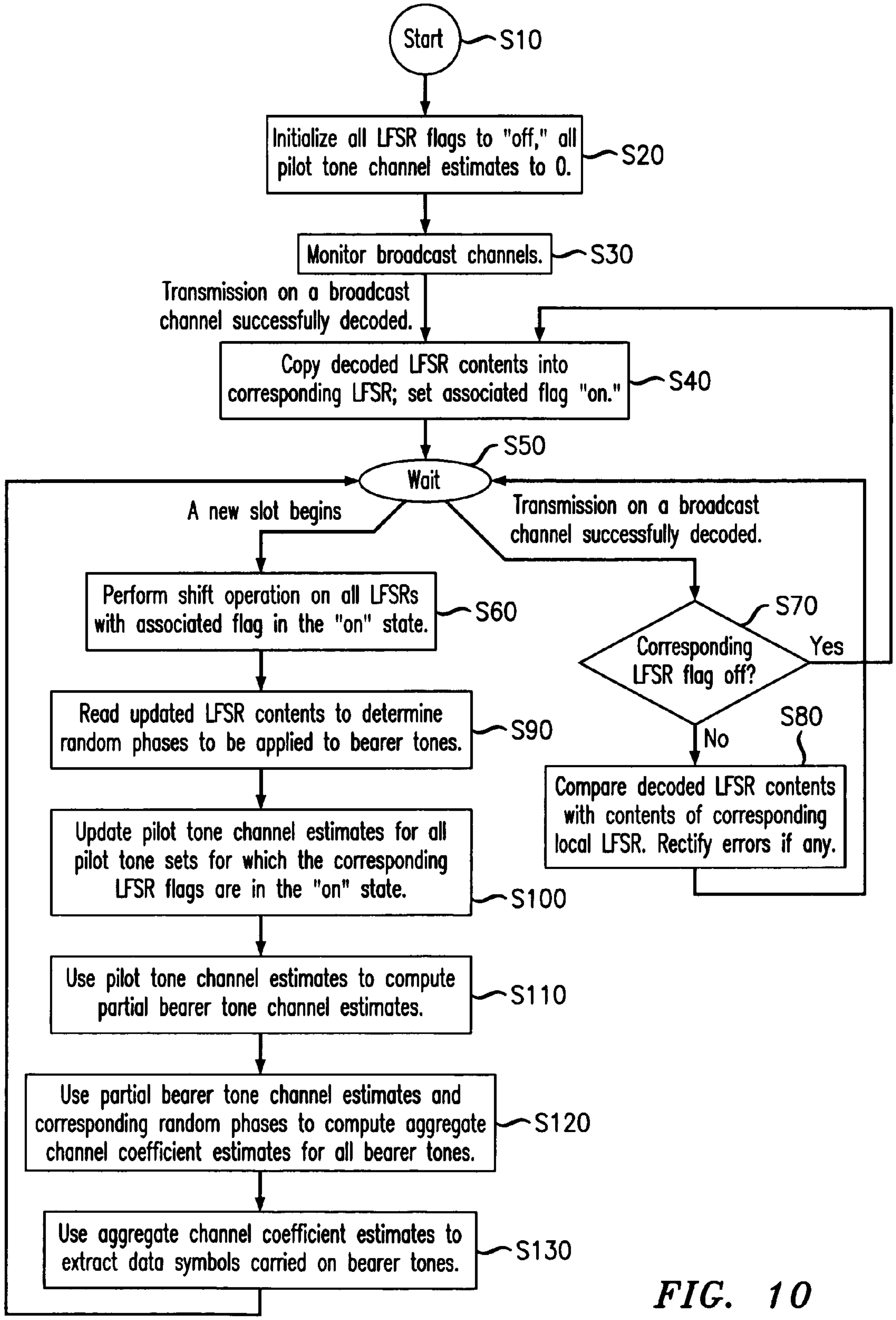
FIG. 10 is a flowchart outlining a receiver operation in a system according to first embodiment to generate random phases.

Once the aggregate channel coefficient estimates have been computed for all bearer tones 68 in this manner, the receiver 51 uses standard decoding techniques to extract the data symbols 80 transmitted over the bearer tones 68. The flow-chart given in FIG. 10 summarizes the receiver operation described above.

The flowchart shown in FIG. 10 will now be described. Step S10 is the start step. In S20, the receiver 51 initializes all LFSR flags to "off," all pilot tone channel estimates to 0. In step S30, the receiver 51 is to monitor broadcast channels. When a transmission on a broadcast channel is successfully decoded, the next step S40 is for the receiver 51 to copy decoded contents of the broadcast channel into corresponding LFSR; and set associates flag to "on." The next step S50 is for the receiver 51 to wait. When a new slot begins, the next step S60 is for the receiver 51 to perform shift operation on the LFSRs with associated flag in the "on" state. At step S50, the receiver 51 waits until the transmission on a broadcast channel is successfully decoded by the receiver 51 or a new slot begins, whichever occurs first. If the receiver 51 moves out of the wait state because the transmission on a broadcast channel is successfully decoded, the receiver 51 goes to step S70 where it determines whether a corresponding LFSR flag is off. If yes, the receiver 51 goes to S40 where it copies the decoded contents of the broadcast channel into the corresponding LFSR, sets the associated flag in the "on" state and proceeds to the wait state S50. If the LFSR flag was not off in step S70, then the receiver 51 moves to step S80 where it compares decoded LFSR contents with contents of corresponding local LFSR and rectifies errors if any and returns to step S50. If the receiver 51 gets out of step S50 because a new slot has begun, it moves to step S60 where it performs the shift operation on all LFSRs with associated flags in the on state. The receiver 51 then moves to step S90, where it reads the updated LFSR contents to determine random phases to be applied to bearer tones. In the next step S100, the receiver 51 updates pilot tone channel estimates for all pilot tones set for which the corresponding LFSR flag are in the "on" state. The next step S110 is for the receiver 51 to use pilot tone channel estimates to compute partial bearer tone channel estimates. The next step S120 is for the receiver 51 to use partial bearer tones channel estimates and corresponding random phases to compute aggregate channel coefficient estimates for all bearer tones. The next step S130 is for the receiver 51 to use aggregate channel coefficient estimates to extract data symbols carried on bearer tones. After step S130, the receiver 51 returns to step S50, to wait.

If the system is operating according to method 2 described earlier, the receiver 51 operates slightly differently. In this method the contents of the LFSR maintained by all base stations 52 are identical at all times. Thus, the receiver 51 maintains one LFSR; and all base stations 52 periodically transmit the contents of their base stations 52 on a common broadcast channel. Here, too, the LFSR maintained by a receiver 51 has an associated flag whose state is initialized to "off." The receiver 51 also maintains pilot tone channel estimates $\hat{h}_{P1}^{(A)}, \hat{h}_{P2}^{(A)}, \ldots, \hat{h}_{PL}^{(A)}, \hat{h}_{P1}^{(B)}, \hat{h}_{P2}^{(B)}, \ldots, \hat{h}_{PL}^{(B)}$, and $\hat{h}_{P1}^{(C)}, \hat{h}_{P2}^{(C)}, \ldots, \hat{h}_{PL}^{(C)}$, all initialized to 0 at the beginning. As soon as the receiver 51 can successfully decode the LFSR contents transmitted on the common broadcast channel by all base stations 52, the receiver 51 changes the state of its LFSR's associated flag to "on," and then performs the following steps during each time-slot:

At the beginning of each time-slot, the receiver 51 performs the shift operation on its LFSR and reads its updated contents to determine the random phases 78 applied to each bearer tone 68 by base stations 52 associated with each reuse group. (That is, it determines the random phases 78 used by base stations 52 in reuse group $S_A$, as well those used by base stations 52 in reuse group $S_B$ and those used by base stations 52 in reuse group $S_C$.)

Next, it updates pilot tone channel estimates for pilot tones 60 belonging to each of the three pilot tone sets 62, 64, 66—A, B, and C.

Then, for each of the three pilot tone sets 62, 64, 66, the receiver 51 uses the just computed pilot tone channel estimates to compute the corresponding partial bearer tone channel estimates.

Figure 11:
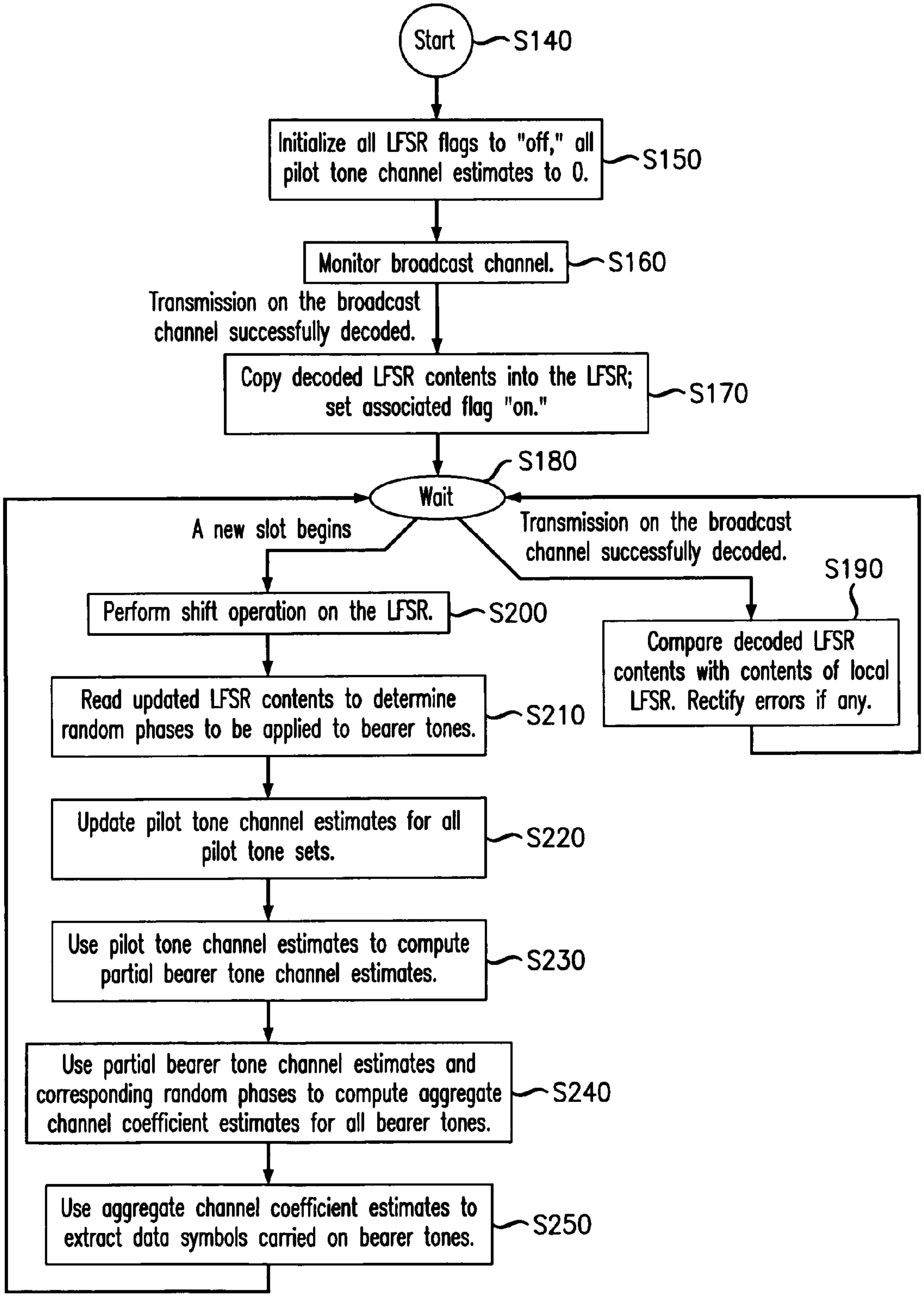
FIG. 11 is a flowchart outlining a receiver operation in a system according to a second embodiment to generate random phases.

Then, using the partial bearer tone channel estimates corresponding to all pilot tone sets 62, 64, 66 (or, equivalently, to all reuse groups) and the previously determined random phases 78, the receiver 51 computes aggregate channel estimates for all bearer tones 68 in accordance with equation (13c). The aggregate channel estimates are then used in conjunction with standard decoding techniques to extract the data symbols 80 transmitted over the bearer tones. FIG. 11 summarizes the receiver operation according to an embodiment of the present invention.

The flowchart shown in FIG. 11 will now be described. The first step S140 is the start step. Next step S150 is for the receiver 51 to initialize the LFSR flag to "off," and all pilot tone channel estimates to 0. The next step S160 is for the receiver 51 to monitor the broadcast channel. When the transmission on the broadcast channel is successfully decoded, the next step S170 is for the receiver 51 to copy decoded LFSR contents into the LFSR; and set associated flag "on." The next step S180 is for the receiver 51 to wait. If the receiver 51 gets out of the wait step S180 because transmission on the broadcast channel is successfully decoded, the next step for the receiver 51 is S190 where it compares decoded LFSR contents included in the transmission on the broadcast channel with contents of local LFSR, and rectifies errors if any. The receiver 51 then returns to step S180 to wait. When a new slot begins, the receiver 51 leaves wait step S180 and moves to step S200 to perform a shift operation on the LFSR. The next step S210 is for the receiver 51 to read updated LFSR contents to determine random phases to be applied to bearer tones. The next step S220 is for the receiver 51 to update the pilot tone channel estimate for all pilot tone sets. The next step S230 is for the receiver 51 to use pilot tone channel estimates to compute partial bearer tone channel estimates. The next step S240 is for the receiver 51 to use partial bearer tone channel estimates and corresponding random phases to compute aggregate channel coefficient estimates for all bearer tones. The next step S250 is for the receiver 51 to use aggregate channel coefficient estimates to extract data symbols carried on bearer tones. After step S250 is completed, the receiver 51 returns to step S180 to wait for either a new slot to begin and a new transmission on the broadcast channel to successfully be decoded as described above.

A Scheme to Reduce Pilot Tone Overhead

The overall implementation of some embodiments in accordance with the present invention, described in the above section titled "Implementation of Random Transmit Phases in a Single Frequency Network," assumed that for each reuse group a separate pilot tone 60 was assigned so that no two base stations 52 that belong to two distinct reuse groups would transmit their pilot signals on the same tone 60. This scheme can result in an increase in the pilot tone 60 overhead in comparison to ordinary SFNs 50. In an ordinary SFN 50, all base stations 52 transmit their pilot signals over the same set of tones 60. If separate sets of tones 62, 64, 66 are to be assigned to base stations 52 belonging to different reuse groups, in an embodiment in accordance with the present invention using reuse parameter 3, three times as many pilot tones 60 would be needed as in a comparable system employing the standard SFN technique. Thus, for instance, if one out of every ten tones 58 need to be set aside as a pilot tone 60 (in order to track the channel coefficients for the entire band), about 30% of all tones 58 would have to be set aside as pilot tones 60 in an embodiment of the present invention with reuse parameter 3. In contrast, only 10% of all tones 58 would be used as pilot tones 60 in a standard SFN 50. The scheme presented in this section embodies a method to reduce the pilot tone overhead (i.e. the fraction of all tones 58 used for sending pilot symbols) in SFNs 50 employing randomized transmit phases in accordance with some embodiments of the present invention.

The proposed scheme is described using the example with reuse parameter 3 that has been used all along to explain the implementation of some embodiments of the present invention. The proposed scheme makes use of the fact that pilot tone processing typically involves filtering to suppress the effect of noise and the fact that typically the duration of a time-slot is short enough so that the channel coefficients for a given tone corresponding to two consecutive time-slots are close to each other. Similarly, the frequency separation between adjacent tones is small enough so that the channel coefficients associated with them (for the same time-slot) are also close.

Figure 12:
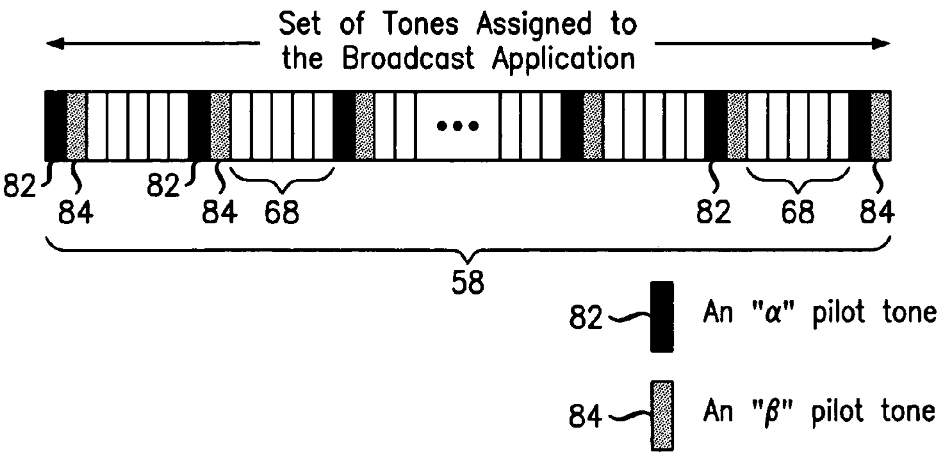
FIG. 12 illustrates a broadcast span of a continuous band of frequencies showing a set of tones assigned to a broadcast application illustrating an alpha and beta pilot tone.

With reuse parameter 3, a straightforward implementation of the present invention, as embodied in FIG. 2, would have three pilot tones 60 for every pilot tone 60 used in an equivalent standard SFN 50. Instead, the proposed scheme uses two pilot tones 82, 84 for every pilot tone 60 used in an equivalent ordinary SFN 50. These pilot tones 82, 84 occur as pairs of adjacent tones as shown in FIG. 12:

In each pair of pilot tones 82, 84, one tone 82 (for example, the one associated with a lower frequency) is called an "α" tone 82 and the other a "β" tone 84 as shown in FIG. 12. In accordance with the proposed scheme, base stations 52 belonging to the three reuse groups ($S_A$, $S_B$ and $S_C$) transmit their pilot symbols as follows:

In each odd time-slot (i.e. t=1, 3, 5, . . . ), the base stations 52 transmit the following pilot symbols: 1). All base stations 52 belonging to reuse group $S_A$ transmit the symbol x=1 on their α pilot tones 82 as well as their β pilot tones 84; 2). All base stations 52 belonging to reuse group $S_B$ transmit the symbol x=1 on their α pilot tones 82 and the symbol x=−1 on their β pilot tones 84; 3). All base stations 52 belonging to the reuse group $S_C$ transmit the symbol x=1 on their α pilot tones 82 as well as their β pilot tones 84.

In each even time-slot (i.e. t=2, 4, 6, . . . ), the base stations 52 transmit the following pilot symbols: 1). All base stations 52 belonging to reuse group $S_A$ transmit the symbol x=1 on their α pilot tones 82 as well as their β pilot tones 84; 2). All base stations 52 belonging to reuse group $S_B$ transmit the symbol x=1 on their α pilot tones 82 and the symbol x=−1 on their β pilot tones 84; 3). All base stations 52 belonging to the reuse group $S_C$ transmit the symbol x=−1 on their α pilot tones 82 as well as their β pilot tones 84.

The pilot symbols transmitted by each reuse group over a pilot tone 82, 84 pair during every pair of consecutive time-slots beginning with an odd time-slot form three rows of a 4×4 Hadamard matrix. Specifically, reuse group A transmits the symbols [+1 +1 +1 +1] over such a pair of time-slots; reuse group B transmits the symbols [+1 −1 +1 −1] while reuse group C transmits the symbols [+1 +1 −1 −1] over the same pair of time-slots. The rows of a Hadamard matrix are orthogonal to one another. This fact is used in the pilot tone processing carried out at the receiver 51.

Pilot Tone Processing at the Receiver

It is assumed that there are L pairs of adjacent α and β pilot tones 82, 84 spread over the band being used by the SFN 50. One of these pairs 82, 84 is focused on, for example the $j^{th}$, during time-slots t−1 and t. The corresponding received signals are labeled as $r_j^{\alpha}(t-1)$, $r_j^{\beta}(t-1)$, $r_j^{\alpha}(t)$, and $r_j^{\beta}(t)$. Let the time-slot t be even. Since t is even, it follows:

$$r_j^{\alpha}(t-1)=\sum_{i\in S_A}^{N} h_{i,j}^{(\alpha)}(t-1)+\sum_{i\in S_B}^{N} h_{i,j}^{(\alpha)}(t-1)+\sum_{i\in S_C}^{N} h_{i,j}^{(\alpha)}(t-1)+n_j^{(\alpha)}(t-1), \tag{14a}$$

where $h_{i,j}^{(\alpha)}(t-1)$ denotes the channel coefficient associated with base station 52 *i* for the "α" pilot tone 82 of the $j^{th}$ pair during time-slot t−1, and $n_j^{(\alpha)}(t-1)$ represents the noise in the received signal $r_j^{\alpha}(t-1)$. Similarly, it is written as:

$$r_j^{\beta}(t-1)=\sum_{i\in S_A}^{N} h_{i,j}^{(\beta)}(t-1)-\sum_{i\in S_B}^{N} h_{i,j}^{(\beta)}(t-1)+\sum_{i\in S_C}^{N} h_{i,j}^{(\beta)}(t-1)+n_j^{(\beta)}(t-1), \tag{14b}$$

$$r_j^{\alpha}(t)=\sum_{i\in S_A}^{N} h_{i,j}^{(\alpha)}(t)+\sum_{i\in S_B}^{N} h_{i,j}^{(\alpha)}(t)-\sum_{i\in S_C}^{N} h_{i,j}^{(\alpha)}(t)+n_j^{(\alpha)}(t), \tag{14c}$$

and $$r_j^{\beta}(t)=\sum_{i\in S_A}^{N} h_{i,j}^{(\beta)}(t)-\sum_{i\in S_B}^{N} h_{i,j}^{(\beta)}(t)-\sum_{i\in S_C}^{N} h_{i,j}^{(\beta)}(t)+n_j^{(\beta)}(t). \tag{14d}$$

When the received signals are extracted, they are saved for at least one more time-slot. Thus, during the time-slot t, the receiver 51 has the received signals associated with the current slot (i.e. time-slot t), as well as those associated with time-slot t−1. Thus, assuming t is even, for each pilot tone pair 82, 84 *j*, the receiver 51 forms the pilot tone channel estimates corresponding to each reuse group as follows:

$$\hat{h}_j^{(A)}(t)=[r_j^{\alpha}(t-1)+r_j^{\beta}(t-1)+r_j^{\alpha}(t)+r_j^{\beta}(t)]/4, \tag{15a}$$

$$\hat{h}_j^{(B)}(t)=[r_j^{\alpha}(t-1)-r_j^{\beta}(t-1)+r_j^{\alpha}(t)-r_j^{\beta}(t)]/4, \tag{15b}$$

and $$\hat{h}_j^{(C)}(t)=[r_j^{\alpha}(t-1)+r_j^{\beta}(t-1)-r_j^{\alpha}(t)-r_j^{\beta}(t)]/4, \tag{15c}$$

where, for the $j^{th}$ pilot tone pair 82, 84, $\hat{h}_j^{(A)}(t)$, $\hat{h}_j^{(B)}(t)$, and $\hat{h}_j^{(C)}(t)$ are the pilot tone channel estimates corresponding to reuse groups $S_A$, $S_B$ and $S_C$, respectively. In view of the relationships between received signals and channel coefficients as embodied in equations 14a-d, if the channel coefficients for adjacent tones are close and if they vary by at most a small amount over one time-slot, it is easy to show that the pilot tone channel estimates $\hat{h}_j^{(A)}(t)$, $\hat{h}_j^{(B)}(t)$, and $\hat{h}_j^{(C)}(t)$ nearly equal the average values of the channel coefficients associated with the corresponding pilot tone pair in reuse groups A, B and C. Specifically:

$$\hat{h}_j^{(A)}(t)\approx\left[\begin{array}{c}\sum_{i\in S_A}^{N} h_{i,j}^{(\alpha)}(t-1)+\sum_{i\in S_A}^{N} h_{i,j}^{(\beta)}(t-1)+\\ \sum_{i\in S_A}^{N} h_{i,j}^{(\alpha)}(t)+\sum_{i\in S_A}^{N} h_{i,j}^{(\beta)}(t)\end{array}\right]\Big/4, \tag{16a}$$

-continued $$\hat{h}_j^{(B)}(t) \approx \left[\sum_{i\in S_B}^{N} h_{i,j}^{(\alpha)}(t-1) + \sum_{i\in S_B}^{N} h_{i,j}^{(\beta)}(t-1) + \sum_{i\in S_B}^{N} h_{i,j}^{(\alpha)}(t) + \sum_{i\in S_B}^{N} h_{i,j}^{(\beta)}(t)\right] \Big/ 4, \tag{16b}$$

and $$\hat{h}_j^{(C)}(t) \approx \left[\sum_{i\in S_C}^{N} h_{i,j}^{(\alpha)}(t) + \sum_{i\in S_C}^{N} h_{i,j}^{(\beta)}(t) + \sum_{i\in S_C}^{N} h_{i,j}^{(\alpha)}(t) + \sum_{i\in S_C}^{N} h_{i,j}^{(\beta)}(t)\right] \Big/ 4. \qquad (16c))$$

In case the time-slot t is odd, the receiver forms the pilot tone channel estimates using the following equations:

$$\hat{h}_j^{(A)}(t)=[r_j^{\alpha}(t-1)+r_j^{\beta}(t-1)+r_j^{\alpha}(t)+r_j^{\beta}(t)]/4, \tag{17a}$$

$$\hat{h}_j^{(B)}(t)=[r_j^{\alpha}(t-1)-r_j^{\beta}(t-1)+r_j^{\alpha}(t)-r_j^{\beta}(t)]/4, \tag{17b}$$

and $$\hat{h}_j^{(C)}(t)=[-r_j^{\alpha}(t-1)-r_j^{\beta}(t-1)+r_j^{\alpha}(t)+r_j^{\beta}(t)]/4, \tag{17c}$$

It is shown that even when the time-slot t is odd, pilot tone channel estimates formed in the just described manner nearly equal the average value of the channel coefficients associated with the corresponding pilot tone pair in reuse groups A, B and C if channel coefficients for adjacent tones are close and they do not vary much over one time-slot.

The pilot tone channel estimates obtained in the manner described above can be used directly to obtain bearer tone channel estimates via suitable interpolation techniques. Alternatively, the pilot tone channel estimates can be further processed (e.g. via exponential averaging) for additional noise suppression before they are used to obtain bearer tone channel estimates.

Note that the proposed scheme results in a 33% reduction in the pilot tone overhead for the example with reuse parameter 3. While this scheme is described using a system 50 with reuse parameter 3, those familiar with the art can easily adapt it to systems with different reuse patterns. Also, the proposed schemes can be used to reduce pilot tone 60 overhead in other kinds of systems where there is a need to estimate channel coefficients associated with different base stations/antennas. An example of such a system would be an "Orthogonal SFN."

A slightly different embodiment of the present invention is now described that does not require multiple pilot tone sets 62, 64, 66; as a consequence, it does not entail the implementation of pilot-tone-set reuse. In this embodiment of the invention, the tones 58 being used for the broadcast/multicast application are divided into multiple groups 86. Each group of tones 86 has one or more pilot tones 60 embedded in it. The channel estimates for the bearer tones 68 included in a group 86 are computed using the pilot tones 60 embedded in that group 86 only. Base stations 52 apply the random phase rotations to the tones associated with the broadcast/multicast application as follows: During each time slot, each base station 52 generates an independent random phase for each group of tones 86. (The random phases generated by different base stations 52 are independent. Also, the random phases generated by a given base station 52 for different groups of tones 86 in the same slot or for the same group of tones 86 in different slots are independent.) In any given time slot, each base station 52 rotates all tones 58 including the pilot tones 60 that belong to the same group 86 by the same random phase that was generated by the base station 52 for that group of tones 86 during that time slot. Thus, for a tone k that belongs to group 86 *q*, the received signal during time slot t is given by $$r^{(k)}(t) = \sum_{i=1}^{N} h_i^{(k)}(t)\exp(j\phi_{iq}(t))x^{(k)}(t) + n^{(k)}(t), \tag{18}$$

which means that from the receiver's viewpoint, the above scheme is equivalent to having the complex data symbol $x^{(k)}(t)$ being received over an aggregate channel with channel coefficient, as shown below:

$$h_{rand}^{(k)}(t) = \sum_{i=1}^{N} h_i^{(k)}(t)\exp(j\phi_{iq}(t)). \tag{19}$$

Since the pilot tones 60 belonging to group 86 *q* are also rotated by the same random phase as the corresponding bearer tones 68, equation (15) holds for pilot tones 60 as well. Because of the fact that the aggregate channel coefficient $h_{rand}^{(k)}(t)$ has the same form (including the random phases) for all tones in group 86 *q* and that channel coefficients for all tones in group 86 *q* are to be estimated using pilot tones 60 in that group 86 only, one does not need to obtain individual channel coefficients associated with different base stations 52 as in the previously described embodiments. Here, for a given group of tones 86, the aggregate channel coefficients estimated using the aggregate received signals over the pilot tones 60 in that group 86 are adequate for the purpose of demodulation of all bearer tones 68 in that group. Since we do not need to estimate individual channel coefficients associated with different base stations 52, we do not need to allocate different sets of pilot tones 60 to different base stations 52 in order to enable estimation of individual channel coefficients. (Basically, all base stations 52 use the same set of pilot tones 60.) The concept of reuse of pilot tone sets, which was introduced to reduce the pilot overhead, is also irrelevant in the presently described embodiment.

Now, because of the fact that each base station 52 rotates all tones in a group 86 by the same random phase, if the aggregate channel coefficient $h_{rand}^{(k)}(t)$ is small for some tone k in a group of tones 86 *q*, it is likely to be small for all tones in group 86 *q*. As a result, if a number of data symbols 80 that have been assigned to different tones in group 86 *q* occur close together in the decoding order at the receiver 51, a decoding error is likely to occur because of the relatively low signal-to-noise ratio of those data symbols 80. We minimize the likelihood of such events by interleaving the data symbols 80 before they are assigned to tones. The interleaving ensures that not many data symbols 80 assigned to tones in the same group of tones 86 occur close to one another in the decoding order. Note that when data symbols 80 assigned to tones in different groups 86 appear close to one another in the decoding order, the likelihood that a significant number of them will have a low signal to noise ratio will be rather small because of the fact that phase rotations provided to tones in different groups 86 are independent of each other.

Figure 13:
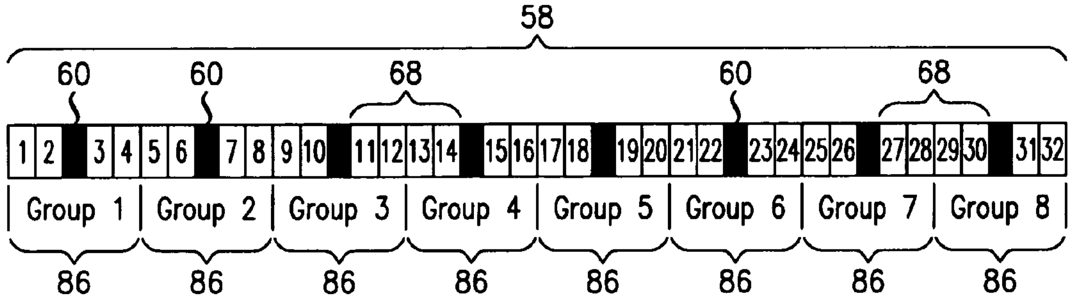
FIG. 13 illustrates an application using 40 tones in each time slot and the 40 tones are divided into eight groups.

A small example is presented to illustrate the now described embodiment of the invention. In this example, it is assumed that the broadcast/multicast application uses 40 tones in each time slot and that these 40 tones are divided into 8 groups 86. FIG. 13 shows an arrangement of these tones. Although all eight groups of tones 86 have been shown to occupy contiguous positions in FIG. 13, they need not be contiguous. In fact, different groups of tones 86 can be scattered anywhere in the overall system spectrum as long as tones within each group are close to one another. As shown in FIG. 13, the middle tone in each group (shaded black) is the corresponding pilot tone 60 while the remaining 4 tones are bearer tones 68. The 32 bearer tones 68 have been labeled 1, 2, . . . , 32 in FIG. 13.

Figure 14:
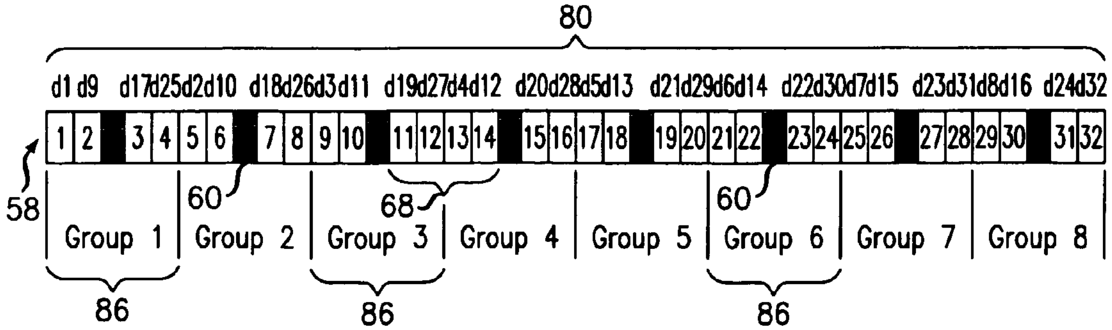
FIG. 14. illustrates an assignment of the 32 data symbols to the bearer tone after the data symbols have been interleaved.

In each time slot, the 32 data symbols 80 that are to be carried over the 32 bearer tones 68 (four in each of the eight groups 86) are interleaved before they are assigned to the bearer tones 68. FIG. 14 shows an assignment of the 32 data symbols 80 to the 32 bearer tones 68 after the data symbols 80 have been interleaved. In FIG. 14, the labels d1, d2, . . . , d31, d32 denote the 32 data symbols in the original order.

Note that with the above assignment of data symbols 80 to bearer tones 68, when the data symbols 80 are arranged in the decoding order (i.e. in the sequence d1, d2, d3, . . . , d32) at the receiver 57, any contiguous sequence of data symbols 80 will have a maximal diversity of tone groups 86. For instance, any contiguous sequence of eight or fewer data symbols (in the decoding order) will be associated with an equal number of distinct tone groups. Since phase rotations associated with different tone groups 86 are independent, having a maximal diversity of tone groups 86 will ensure that there is a significant amount of randomness in the relative phase differences affecting the aggregate received signal for different bearer tones 68. This will significantly reduce probability that a large number of data symbols 80 appearing close to one another in the decoding order will experience destructive superposition.

Continuing with the example, each base station transmitter maintains a 32-bit LFSR. The LFSRs maintained by different base stations 52 do not need to be initialized in a specific manner (as required in the previously described embodiments.) All that is ensured is that the states of the LFSRs for different base stations 52 are sufficiently apart so that the random sequences they generate appear mutually independent. At the beginning of each time slot, each base station 52 performs the shift operation on its LFSR and reads the new contents of the LFSR. The new contents of the LFSR are then read to generate 8 random phases 78 (one for each group of tones 86) using a suitable scheme. For instance, the scheme shown in FIG. 8 could be used to map the LFSR contents to the 8 random phases 78. The base station transmitter then rotates all tones in each group 86 (including the pilot tone 60) by the random phase 78 associated with that group 86. Next, each bearer tone 68 is modulated by the data symbol assigned to it as shown in FIG. 14. (Recall that the pilot tones are transmitted without any modulation.) The complete set of tones, thus modulated, are then handed down to lower layers for further processing prior to transmission.

In contrast to previously described embodiments of the invention, the receiver 51 does not maintain any LFSRs in this embodiment. During each time slot, the receiver 51 simply uses the aggregate received signal over each pilot tone 60 to generate a channel estimate that is used to demodulate the signals received over the bearer tones 68 belonging to the same group. This results in a simpler receiver operation. Note that with a small number of tones per group 86 (e.g. in the example being described here), a single pilot tone 60 per group 86 would be adequate. With a large number of tones per group 86, multiple pilot tones 60 would have to be embedded in each group 86 and a suitable interpolation scheme would have to be implemented to generate channel estimates associated with each bearer tone 68 in the group. Such an arrangement is consistent with the present embodiment of the invention since all it requires is that each transmitter 51 should rotate all tones in a group 86 (including pilot tones 60) by the same random phase and that rotations provided different transmitters be independent.

An implicit assumption in the description of the example embodiments given above is that there is a single transmit antenna for each cell or cell sector associated with a base station. That is, in the case of a base station with an omnidirectional antenna, the base station's coverage area (cell) was served by a single antenna, whereas in the case of a base station with a sectorized antenna, each cell sector was served by a single antenna. The present invention is not restricted to such scenarios. It is easy to apply principles described herein to scenarios where one or more of the cells or cell sectors associated with one or more base stations are each served by more than one antenna. When multiple antennas serve a single cell in the case of omni-directional antennas or when multiple antennas serve a single cell sector in the case of sectorized antennas, we refer to the multiple antennas serving the same cell or cell sector as antenna elements. The principles described herein can be applied to scenarios with multiple antenna elements serving the same cell or cell sectors in at least two ways:

First, when multiple antenna elements serve a given cell or cell sector associated with a base station, each of them is assigned a distinct pilot tone set and each of them has an associated pseudo-random number generator to independently generate the pseudo-random phases to be used for transmission of corresponding signals. Thus, not only antenna elements associated with adjacent cells or cell sectors are assigned distinct pilot tone sets, even those that are associated with the same cell or cell sector are also assigned distinct pilot tone sets. It is possible that with a large number of antenna elements per sector, such an assignment of pilot tone sets can result in a significant increase in the pilot overhead.

Second, if multiple antenna elements serve a given cell or cell sector, all of them use the same pilot tone set, and all of them use a common pseudo-random number generator to generate a common set of pseudo-random phases for their signal transmission. In this assignment, the pilot overhead is no greater than that in similar scenarios with a single antenna element per cell or cell sector.

The invention thus being described, it will be obvious that the same may be varied in many ways. Such variations are not to be regarded as a departure from the invention, and all such modifications are intended to be included within the scope of the invention.

What is claimed is:

1. A first base station transmitter, for a broadcast/multicast single frequency network having a plurality of base station transmitters, comprising:

a base station component configured to randomize a phase of the signal for the first base station transmitter to transmit, wherein the first base station transmitter is configured to transmit a signal having a frequency common to a frequency of a signal sent by other base station transmitters in the network, wherein a first pilot tone set transmitted by the first base station transmitter is different than pilot tone sets of the other base station transmitters that are adjacent to the first base station transmitter, wherein the first pilot tone set is used by the other base station transmitters that are not adjacent to the first base station transmitter.

2. The first base station transmitter of claim 1, wherein the first base station transmitter is associated with a first base station, wherein each base station is associated with a pseudo-random phase generator configured to randomize a phase of the signal for the base station transmitters to transmit.

3. The first base station transmitter of claim 1, wherein the first base station transmitter is part of a single frequency network and the network uses Orthogonal Frequency Division Multiplexing.

4. The first base station transmitter of claim 1, wherein each pilot tone contains information for a receiver to determine a channel coefficient for the respective base station transmitter.

5. The first base station transmitter of claim 4, further comprising:

one or more Omni-Directional antenna elements associated with the first base station transmitter.

6. The first base station transmitter of claim 2, further comprising:

multi-sector antennas associated with each of the base stations such that a coverage area associated with each of the base stations comprises multiple cell sectors, one corresponding to each antenna sector; and wherein each of the base stations is configured to transmit on each antenna sector the respective pilot tone set including one or more a pilot tones, wherein each of the pilot tones contains information for a receiver to determine from the pilot tone a channel coefficient associated with the antenna sector.

7. The first base station transmitter of claim 6, wherein each of the antenna sectors comprises one or more antenna elements.

8. The first base station transmitter of claim 2, wherein the pilot tone sets include one or more pilot tones, wherein each pilot tone contains information for a receiver to determine a channel coefficient for the respective base station transmitters and the network as a whole uses three different pilot tone sets at any given time.

9. The first base station transmitter of claim 2, wherein pilot tone sets including one or more pilot tones, wherein each of the pilot tones contains information for a receiver to determine from the pilot tone a channel coefficient for the respective base station transmitter and the system as a whole uses more than three different tone sets at any given time.

10. The first base station transmitter of claim 1, wherein one or more bearer tones in a slot are associated with a pseudo-random phase determined from an associated pseudo-random number.

11. The first base station transmitter of claim 1, wherein one or more bearer tones in a slot are associated with a pseudo-random number according to a Linear-Shift-Feedback-Register (LFSR) based scheme.

12. The first base station transmitter of claim 1, wherein different pilot symbols on the pilot tones are transmitted depending upon whether a time slot where the pilot tones are transmitted is an odd or an even time slot.

13. A method for improving performance of single frequency networks comprising:

transmitting single frequency signals with pseudo-random phases from base stations network, including in the signals, data that permits a receiver compatible with the network to synchronously replicate the pseudo-random phases used in the transmission of the single frequency signals, transmitting pilot tone sets from base station transmitters for each of the base stations of the network, the pilot tone set for any particular base station transmitter being different than pilot tone sets for base station transmitters that are adjacent to the particular base station transmitter, the pilot tone set for the particular base station transmitter being used by other base station transmitters of the network that are not adjacent to the particular base station transmitter.

14. The method of claim 13, further comprising receiver actions including:

initializing Linear-Feedback-Shift-Register (LFSR) flags to an off position;

setting tone channel estimates to 0;

decoding a transmission;

copying decoded LFSR contents included in the transmission into a corresponding LFSR;

setting an associated flag to an on position;

when a new slot begins, performing a shift operation of the LFSR;

reading updated LFSR contents to determine random phases to be applied to bearer tones;

updating pilot tone channel estimates using the pilot tone sets;

using the pilot tone channel estimates to compute partial bearer tone channel estimates;

using partial bearer tone channel estimates and corresponding pseudo-random phases to compute aggregate channel coefficient estimates for all bearer tones; and using aggregate channel coefficient estimates to extract data symbols carried on bearer tones.

15. The method of claim 14, further comprising:

comparing decoded LFSR contents with contents of corresponding local LFSR if a corresponding LFSR flag is on.

16. The method of claim 14, further comprising:

comparing decoded LFSR contents with contents of corresponding local LFSR and rectifying any errors.

17. The method of claim 14, wherein the updating of the pilot tone channel estimates for all pilot tone sets is done for only the pilot tone sets for which the corresponding LFSR flags are in an on position.

18. A method for signal transmission at each base station in a broadcast/multicast single frequency network, comprising:

assigning groups of tones to base station transmitters for each of the base stations in the network;

generating a pseudo-random phase for each group of tones;

rotating all tones within a particular group of tones by the same pseudo-random phase as was generated by the base station for the group of tones for a particular time slot, the group of tones for a particular base station transmitter being different than assigned group of tones for base station transmitters that are adjacent to the particular base station transmitter, the group of tones for the particular base station transmitter being assigned to other base station transmitters of the network that are not adjacent to the particular base station transmitter.

* * * * *